(12) United States Patent
DiAcetis et al.

(10) Patent No.: US 10,389,731 B2
(45) Date of Patent: Aug. 20, 2019

(54) MULTI-FACTOR AUTHENTICATION USING POSITIONING DATA

(71) Applicant: Microsoft Technology Licensing, LLC, Redmond, WA (US)

(72) Inventors: Stephen P. DiAcetis, Duvall, WA (US); David Mahlon Hoover, Woodinville, WA (US); Cristina del Amo Casado, Seattle, WA (US); Lanny D. Natucci, Jr., Tacoma, WA (US); Janet Lynn Schneider, Bellevue, WA (US); Sanjib Saha, Sammamish, WA (US); Fernando Gonzalez, Bellevue, WA (US); Jonathan Matthew Kay, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 176 days.

(21) Appl. No.: 15/358,686

(22) Filed: Nov. 22, 2016

(65) Prior Publication Data

US 2018/0145990 A1    May 24, 2018

(51) Int. Cl.
*H04L 29/06* (2006.01)
*G06F 16/29* (2019.01)
(Continued)

(52) U.S. Cl.
CPC ............ *H04L 63/107* (2013.01); *G06F 16/29* (2019.01); *G06F 21/30* (2013.01); *H04L 63/08* (2013.01);
(Continued)

(58) Field of Classification Search
None
See application file for complete search history.

(56) References Cited

U.S. PATENT DOCUMENTS 6,370,629 B1 * 4/2002 Hastings ............. G06F 21/6218
711/153
7,373,515 B2   5/2008 Owen et al.
(Continued)

OTHER PUBLICATIONS

Zhang, et al., "Location-based Authentication and Authorization Using Smart Phones", In Proceedings of the IEEE 11th International Conference on Trust, Security and Privacy in Computing and Communications, Jun. 25, 2012, 8 pages.
(Continued)

*Primary Examiner* — Shin-Hon (Eric) Chen
(74) *Attorney, Agent, or Firm* — Newport IP, LLC; Mike R. Cicero; Scott Y. Shigeta

(57) ABSTRACT

Techniques described herein provide multi-factor authentication based on positioning data. Generally described, configurations disclosed herein enable a system to authorize a particular action using positioning data, and possibly other data, associated with an identity. For example, when a user wishes to change a password or access a secured account, the system can authenticate a user if a device associated with the user is located in the secure area. The system can authenticate a user if a requested operation and/or a predetermined pattern of movement associated with the user is detected. For instance, the system allows the user to change the password when the user's computer has followed a predetermined pattern of movement, and when one or more verification procedures meets one or more criteria while the location of the computing device is within the predetermined area.

22 Claims, 9 Drawing Sheets

(51) Int. Cl.
*H04W 4/021* (2018.01)
*G06F 21/30* (2013.01)
*H04W 12/06* (2009.01)
*H04W 12/08* (2009.01)
*H04W 4/029* (2018.01)
*G07C 9/00* (2006.01)
*H04W 12/00* (2009.01)

(52) U.S. Cl.
CPC ........ *H04L 63/083* (2013.01); *H04L 63/0861* (2013.01); *H04L 63/10* (2013.01); *H04W 4/021* (2013.01); *H04W 12/06* (2013.01); *H04W 12/08* (2013.01); *G07C 9/00134* (2013.01); *H04L 2463/082* (2013.01); *H04W 4/029* (2018.02); *H04W 12/00508* (2019.01)

(56) References Cited

U.S. PATENT DOCUMENTS

| | | | | |
|---|---|---|---|---|
| 8,079,079 | B2* | 12/2011 | Zhang | G06F 21/32 706/48 |
| 8,832,806 | B2 | 9/2014 | Ozzie et al. | |
| 9,762,553 | B2* | 9/2017 | Ford | H04L 63/0428 |
| 2007/0067642 | A1 | 3/2007 | Singhal | |
| 2008/0307515 | A1 | 12/2008 | Drokov et al. | |
| 2009/0187962 | A1 | 7/2009 | Brenneman et al. | |
| 2012/0303827 | A1 | 11/2012 | Neystadt et al. | |
| 2013/0036462 | A1 | 2/2013 | Krishnamurthi | |
| 2013/0227651 | A1* | 8/2013 | Schultz | G06F 21/32 726/4 |
| 2013/0326600 | A1* | 12/2013 | Sorek | G06Q 20/4016 726/6 |
| 2014/0007225 | A1* | 1/2014 | Gay | G06F 21/36 726/19 |
| 2014/0031011 | A1* | 1/2014 | West | G06F 21/44 455/411 |
| 2014/0096215 | A1 | 4/2014 | Hessler | |
| 2014/0157381 | A1 | 6/2014 | Disraeli | |
| 2014/0373114 | A1* | 12/2014 | Franca-Neto | H04L 63/08 726/6 |
| 2015/0264573 | A1* | 9/2015 | Giordano | H04L 63/08 726/7 |
| 2015/0304435 | A1* | 10/2015 | Bravo | H04L 67/18 726/7 |
| 2015/0381633 | A1 | 12/2015 | Grim et al. | |
| 2016/0026779 | A1* | 1/2016 | Grigg | G06F 21/31 726/4 |
| 2016/0086155 | A1* | 3/2016 | Candelore | G06Q 20/3224 705/21 |
| 2016/0140562 | A1* | 5/2016 | Birukov | G06Q 20/4016 705/39 |
| 2016/0180068 | A1* | 6/2016 | Das | G06F 21/32 726/7 |
| 2017/0093920 | A1* | 3/2017 | Ducatel | H04L 63/20 |
| 2017/0098068 | A1* | 4/2017 | Mantri | G06F 21/36 |
| 2017/0118209 | A1* | 4/2017 | Saravanan | H04L 63/0861 |
| 2017/0329412 | A1* | 11/2017 | Schwesig | G06F 3/017 |
| 2018/0041518 | A1* | 2/2018 | Jacobs | H04L 63/107 |

OTHER PUBLICATIONS

Cristofaro, et al., "A Comparative Usability Study of Two-Factor Authentication", In Proceedings of the Workshop on Usable Security, Feb. 23, 2014, pp. 1-10.

Libicki, et al., "Influences on the Adoption of Multifactor Authentication", In Technical Reports RAND_TR937, Nov. 25, 2011, 63 pages.

Mathers, Bill, "What is Azure Multi-Factor Authentication?", Published on: Sep. 21, 2015, 17 pages. Available at: https://azure.microsoft.com/en-in/documentation/articles/multi-factor-authentication/.

Abdurrahman, et al., "A New Mobile-Based Multi-Factor Authentication Scheme Using Preshared Number, Gps Location and Time Stamp", In Proceedings of International Conference on Electronics, Computer and Computation, Nov. 7, 2013, pp. 293-296.

"International Search Report and Written Opinion Issued in PCT Application No. PCT/US2017/061650", dated Jan. 16, 2018, 12 Pages.

* cited by examiner

MULTI-FACTOR AUTHENTICATION USING POSITIONING DATA

BACKGROUND

Technologies enabling dual-factor authentication provide enhanced security for computer systems. For example, when a user desires to access an account, change a password, or take other similar actions, a system may contact the user by a phone call, a text message or an email. Although current technologies provide an extra layer of security beyond just entering a password or Personal Identification Number (PIN), these technologies also require a user to perform a number of other tasks. In some cases, user may have to utilize a landline phone, access an email account and perform a number of manual data entry tasks. Existing systems leave much to be desired when it comes to a preferred user experience and providing security for users.

It is with respect to these and other considerations that the disclosure made herein is presented.

SUMMARY

Techniques described herein provide multi-factor authentication using positioning data. Generally described, configurations disclosed herein enable a system to authorize an identity to perform one or more operations based on positioning data, and other data, that is associated with the user intending to perform the one or more operations. For example, when a user wishes to change a password, access a secured account, or perform some other type of secured operation, the system can authenticate an identity using positioning data, and in some configurations, gesture data.

In some configurations, the system can authenticate the user using the location of the user along with a pattern of movement performed by the user. For instance, the system can authenticate a user if the user performs a predetermined pattern of movement that is associated with the location of the user. In a particular example, the system allows the user to change the password when the user's computer, or one or more user movements, has followed a predetermined pattern of movement, and the user is located within a particular area. In some configurations, the system can instruct the user to perform a predetermined pattern of movement by displaying the instructions on a display.

In other examples, the predetermined pattern of movement can be associated with the user moving from one location to another location. When the user performs the predetermined pattern of movement and the user is within a predetermined area, the system authorizes the user to perform the requested operation (e.g., change a password, access an account, access secured data, access a secure location, and the like). For instance, a user may be granted temporary authorization to enter a restricted area to perform a repair. In determining when to grant access to the user, the system can grant access to the user in response to determining that the user followed a predetermined pattern of movement from the office of the user to the restricted area.

In some configurations, the system can use other data during authentication of the user. For example, if contextual data, e.g., a user's schedule, calendar invitations, emails, text messages, indicates they had a meeting in his or her manager's office within a predetermined time, the system can track the user's location to determine if the user's pattern of movement is consistent with the activity indicated in the contextual data. According to some configurations, the system can determine the locations that the user visits frequently (or more often than others), and use these locations as a form of verification. For example, the system can assign a score to the location, and use the score in determining whether a weaker/stronger primary authentication is to be used. In other examples, if the data indicates that a user is sitting in his or her office, a system may utilize that location as an acceptable form of verification for a multifactor authentication process. In addition, a verification method can be used, e.g., entry of a password, PIN, or use of a biometric security measure, while the user is in a particular location. The techniques and mechanisms disclosed herein are directed at providing protection against location information tampering. For instance, instead of relying solely on location information, which could possibly be changed, the system can employ one or more additional verification measures.

According to some examples, the system can determine if the user has performed other verification procedures while in a predetermined area. The verification procedures can include, but are not limited to, a user receiving an instruction from the system and determining whether or not the user carries out the instruction. For example, the system may request the user to perform one or more gestures shown on a display within the predetermined area. Successful performance of the gesture can cause the system to generate permission data that enables the user to perform the action, such as changing a password or accessing an account or other secured data.

Techniques disclosed herein can enable a computing system to receive positioning data and other data from computing devices associated with a user. The system can use this data to determine when to enable the user to perform the operation and/or access the secured data. For example, the system can grant access to an account of a user when the user is located within or near a predetermined area, such as the home of the user or the workplace of the user. Further, access to sensitive/confidential resources can be temporarily/permanently suspended by the system if the user is located in predefined disallowed areas, such as the workplace of a competitor workplace or the premises of known unlawful business/organizations.

The positioning data can indicate a position of a user in an outdoor environment or an indoor environment. For example, the positioning data can indicate that the user is within a particular room of a building, near a particular resource (e.g., a printer) within the building, and the like. In some configurations, indoor map data identifies resources of the indoor environment. The resources can include computing device resources and non-computing device resources within the indoor environment. For example, the map data can identify interior pathways, doorways, rooms, or other areas within the indoor environment, as well as other computing resources and non-computing resources. As an example, the map data can identify the boundaries of hallways, offices, common areas, tables, chairs, desks, the location of resources such as printers, copiers, fax machines, as well as identify other types of computing devices and other physical objects with which a user interacts.

In some configurations, the positioning data can indicate the movement of user devices within the environment. In addition, the positioning data can be used by the system to identify movement patterns of user devices. The positioning data can include various types of data, such as a velocity of a user, a direction of a user, a number of steps taken by the user, a gesture performed by the user (e.g. raising and lowering a mobile computing device), and the like. In some cases, the positioning data may be relative to some known location. For example, a location of a user within the indoor environment can be determined using a wireless fidelity (WI-FI) positioning system and/or using sensors available on a user computing device.

The system can also monitor the position of users using the positioning data. As a user travels through rooms and hallways of a building, the system can determine whether or not to continue to allow access to secured data or continue to authorize the user to perform a requested operation. For example, the system can authorize the user to access the data or perform the requested operation while in one area of the building, but not in other areas of the building. Similarly, the system can authorize access to the resources in a case when a predefined number of users are simultaneously present in a designated location.

The system can also generate metadata that defines information about a particular location, a predetermined pattern of movement associated with the particular location, and the like. For example, the metadata may identify a name for the location, name and capabilities of resources within the location, a predetermined pattern of movement used for authentication, and the like.

Configurations disclosed herein can receive and analyze positioning data received from a computing device associated with the user. As described in more detail below, positioning data received from one or more systems, such as one or more GPS devices, Bluetooth LE proximity beacons, wireless routers, W-Fi access points, or other suitable devices, can utilized by the techniques disclosed herein. In addition, configurations disclosed herein can analyze other types of data from other systems to identify a user and the user's position and/or pattern of movement. For instance, the system can utilize imaging technologies, such as facial recognition, to identify a person moving within a field of view of a camera or other type of detector or sensor. Data indicating the position of the camera, heat sensor, motion detector, sound detector or any other type of detector or sensor, can be utilized to identify the position and/or pattern of movement of a detected user. In some configurations, positioning data and other data can be analyzed from multiple systems and multiple computing devices to identify a position or a pattern of movement of one or more users.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number with a letter of a sequence of letters to refer to each individual item. Generic references to the items may use the specific reference number without the sequence of letters.

DETAILED DESCRIPTION

The following Detailed Description describes technologies enabling multi-factor authentication using positioning data. Generally described, configurations disclosed herein enable a system to authenticate a user utilizing positioning data associated with the movement a user. For example, techniques disclosed herein can enable a computing system to receive positioning data and other data from user computing devices as users move throughout the environment, and perform various operations within the environment. The system can generate permission data that authorizes the user to perform a requested operation after authenticating the user using the positioning data.

For illustrative purposes, consider a scenario where a user desires to access a secured resource (e.g., a user account) using a computing device other than the user's computing device. When the user enters a particular location within a building, the system can request that the user perform some action that confirms the user within the particular location and/or perform some predetermined pattern of movement while in the particular location. For example, the system can request the user to take a picture of some known object at the location, perform some interaction with a computing device at the location (e.g., input a fingerprint on a device, swipe or otherwise provide a card to a device, click on a user interface element presented by the device), connect to a wireless network at the location, and the like. The system might also, or alternatively, request the user to move around a table within the room, raise their arm up and down several times, or perform some other predetermined gesture (e.g., wave in a specified pattern). When the system detects that the user has performed the requested operation and/or performed the predetermined pattern of movement, the system can generate permission data that allows the user to change the password.

Figure 1A:
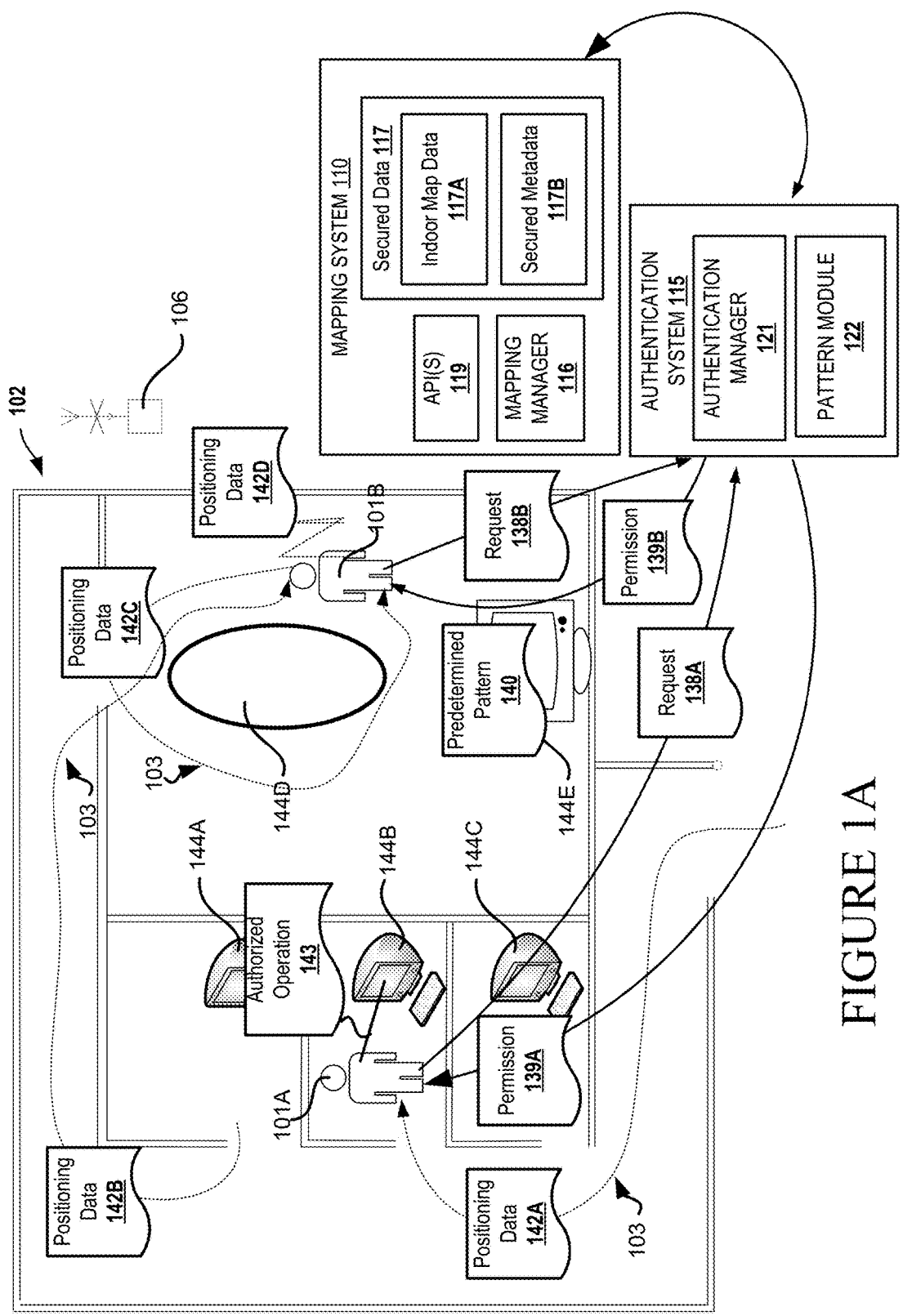
FIGS. 1A-1B illustrate an example of a system that provides multi-factor authentication using positioning data.
Figure 1B:
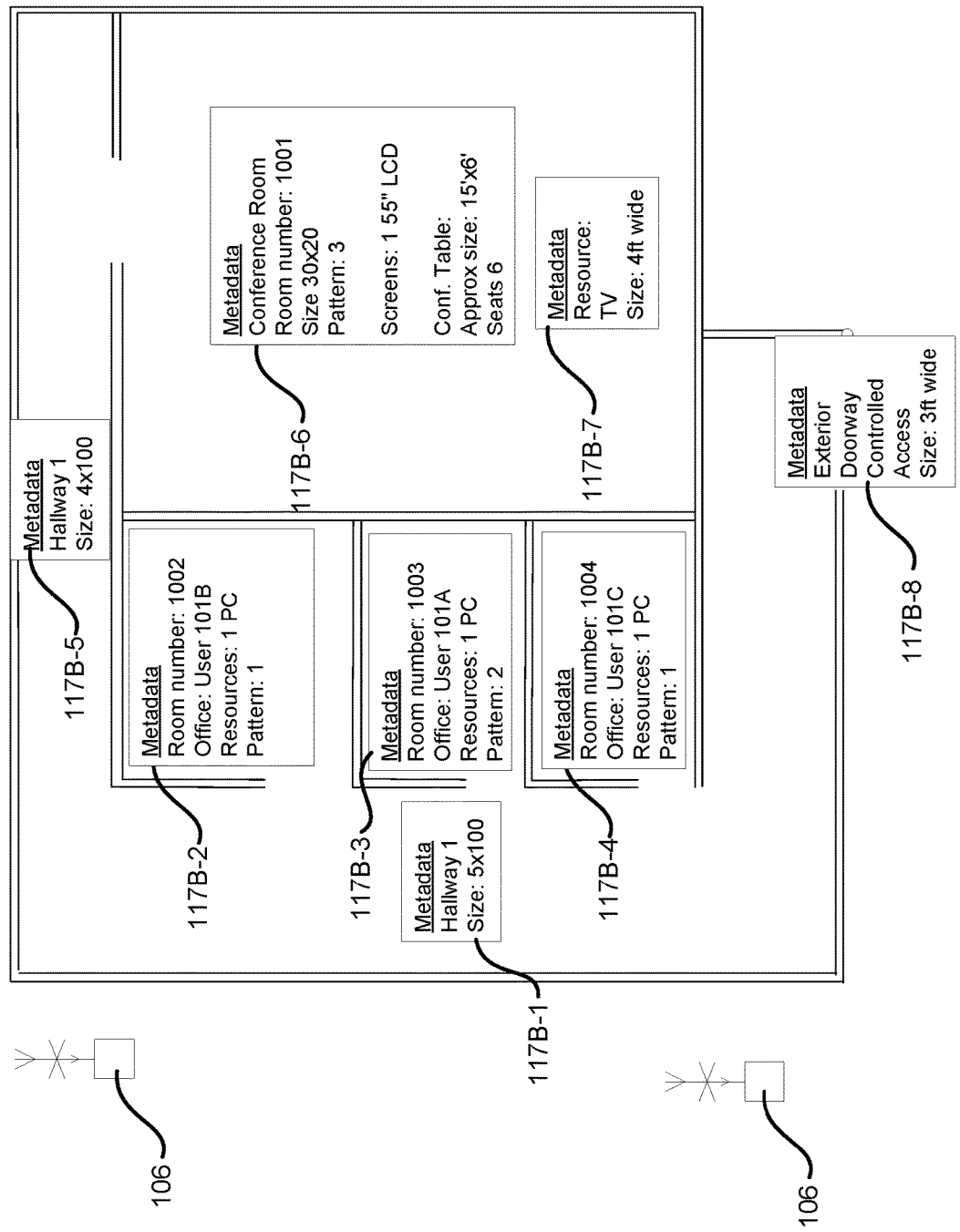

To illustrate aspects of the techniques disclosed herein, FIGS. 1A-1B illustrate an example of a system that provides multi-factor authentication using positioning data. The example of FIGS. 1A-1B includes a representative floor 102 of an office building, which represents part of a larger building. Although this example includes an indoor office environment for a single floor, it can be appreciated that the techniques disclosed herein can be applied to any environment. For instance, the techniques disclosed herein can be applied to a school, a store, a factory, oil refinery, or any other environment that may benefit from a system that can provide different levels of access for different resources to individual identities or select groups of identities.

Turning now to FIG. 1A, the example illustrates a scenario where two different users 101 are requesting authentication in order to access a secured resource. In this example, a first user 101A has sent authentication request 138A to the authentication system 115 and a second user 101B has sent authentication request 138B to the authentication system 115. An authentication request 138 can be a request to access a secured resource or perform an operation relating to a secured resource such as, but not limited to accessing secured data, accessing an account, accessing a secured area (e.g., a secure room), logging onto a computing device, utilizing a printer or some other resource, and the like.

In some configurations, an authentication system 115 interacts with a mapping system 110 to determine the locations of users 101 within an environment. In some configurations, the mapping system 110 can generate indoor map data 117A using positioning data 142 associated with the movement of users 101 and other data (not shown) associated with the interaction of the users with resources within the indoor environment. In other examples, the mapping system 110 accesses map data generated at least in part by one or more other mapping services. In some examples, the mapping system 110 receives positioning data 142 from user computing devices, such as computing device 202 illustrated in FIG. 2.

As described above, resources can include computing device resources and non-computing device resources. For example, the resources can include interior pathways, doorways, rooms, or other areas within the indoor environment, as well as other computing resources and non-computing resources. As an example, the map data can identify the boundaries of hallways, offices, common areas, furniture, the location of resources such as printers, copiers, fax machines, as well as identify other types of computing devices and other physical objects with which a user interacts. The resources can be associated with one or more locations.

Positioning data 142 indicating a location of a user 101 can be generated by a number of suitable technologies. For instance, positioning data 142 indicating a location of a user 101A or user 101B can be generated by a mobile computing device. In another example, positioning data 142 indicating a location of a user 101 can be generated by a camera system utilizing profiling technologies, such as face recognition technologies, to identify and track the movement of a user. According to some configurations, one or more WI-FI access points 106 are positioned in locations around the floor 102. These access points 106 can be used to generate positioning data 142 that indicates the location of users and/or computing devices within the inside environment. Other wired or wireless technologies can be used to enable the mapping system 110 to determine when a person enters, moves within a particular area, enters a particular area, or exits a particular area.

In the example of FIG. 1A, positioning data 142A is obtained from user 101A and positioning data 142C-142D is obtained from user 101B. In some configurations, the positioning data 142 collected by the mapping system 110 or the authentication system 115 can be stored in a memory device.

The stored positioning data 142 can indicate a time of various events, such as a time of stay at a particular location, a user's velocity, direction, ingress, egress, and other activity. The stored positioning data 142 can be used for auditing and/or machine learning purposes.

As a user 101 moves through the environment, such as floor 102, patterns of movement 103 for users can be obtained by the mapping system 110 and/or the authentication system 115. In the example shown in FIG. 1A, the patterns of movement 103 are shown as dashed lines that indicate users 101A-101B have traveled within the floor 102.

These patterns of movement 103 can be used by the authentication system 115 when determining whether or not to authenticate a user. For example, the authentication system 115 can utilize a pattern of movement 103 to detect that the user 101B has left his or her office and traveled to the conference room at a time of a meeting in which the user was invited. The authentication system 115 can determine that this pattern of movement 103 is consistent with a predetermined pattern of movement from the user's office to the conference room and authorize the user 101B and generate permission data 139B that allows the user 101B to access the secure data and/or perform an operation 143 requiring authorization. The various examples provided herein are for illustrative purposes and is not to be construed as limiting. Aspects of the present disclosure can be applied to any suitable environment.

Map data, such as map data 117A, or 118A (shown in FIG. 2) can include topography data and other data that may influence a commute of a user from one location to another. The map data can also include image data which may include still image or video image data of roads and paths within a geographic area as well as images of rooms, resources, buildings and other landmarks. The map data can be based on global positioning coordinates, coordinates defined by private or public beacons, or any other suitable resource. The map data can include indoor map data 117A generated by the mapping system 110, or some other system, and outdoor map data 118A generated by the mapping system 110, or some other system. The map data can be utilized by one or more computing devices for various purposes, e.g., navigational purposes.

In another example of authentication as illustrated in FIG. 1A, the authentication system 115 generates permission data 139A that allows the user 101A to perform an authorized operation 143 (e.g., change a password) in response to authenticating the user 101A. As an example, the authentication system 115 can instruct the user 101A to perform a predetermined pattern of movement by displaying the pattern of movement on the computing device 144B. When the user 101A performs the predetermined pattern of movement and the user is within a predetermined area (e.g., the office), the authentication system 115 authorizes the user to perform the requested operation (e.g., change a password, access an account, access secured data, access a secure location, and the like) by generating permission data 139A.

In addition to using the location of the user and the predetermined pattern of movement, one or more other verification method scan be used by the authentication system 115 (e.g., entry of a password, PIN, or use of a biometric security measure). In some configurations, the authentication system 115 can generate permission data 139 that prevents the user from accessing the secured resource. For instance, the authentication system 115 can generate the permission data 139 that prevents the user from accessing the secured resource when the user leaves a specified area (e.g., leaves the office).

As briefly described above, the positioning data 142 can indicate the movement of user devices within the environment. In addition, the positioning data can be used by the system to identify movement patterns of user devices. The positioning data 142 can include various types of data, such as a velocity of a user, a direction of a user, a number of steps taken by the user, a gesture performed by the user (e.g. raising and lowering a mobile computing device), and the like. In some cases, the positioning data may be relative to some known location. For example, a location of a user within the indoor environment can be determined using a wireless fidelity (WI-FI) positioning system and/or using sensors available on a user computing device.

In the current example, the mapping system 110 and/or the authentication system can use the patterns of movement 103 indicated by the positioning data 142 associated with the user 101B to determine that the user has traveled from an office to the conference room using positioning data 142B, walked around the table 144D using positioning data 142C, and raised and lowered a hand using positioning data 142D. Gestures can also be detected using other mechanisms. For example, the system can detect gestures using image processing techniques, or some other motion detection technique.

As an example, in response to user 101B requesting authorization to a secured resource via request 138B, the authentication system 115 may instruct the user to perform a gesture, such as a hand gesture. As another example, the system 115 can instruct the user to perform a specified pattern of movement. When the gesture and/or the pattern or movement performed by the user 101B is consistent with the predetermined pattern of movement specified by the authentication system 115, the authentication system generates the permission data 139B that allows access to the secured resource. In some configurations, the authentication system 115 can determine that the patterns of movement by the user during a time period deviate from the patterns of movement typically associated with the user. According to some configurations, the authentication system 115 uses one or more machine learning mechanisms to determine when these deviations. In some examples, the authentication system 115 can utilize higher security requirements when the user's patterns of movement deviate from what is normally associated with the user.

Turning now to FIG. 1B, metadata associated with the indoor map data 117A is illustrated. In the current example, the mapping system 110 generates a portion of metadata 117B-1-117B-8 to describe information about resources identified by the map data 117A. The authentication system 115 can also generate a portion of metadata 117B-1-117B-8 to describe information about authentication criteria associated with the particular resource.

Metadata, for instance, can comprise information describing, or information associated with, one or more facilities. For example, metadata can include, but is not limited to, data related to rooms, hallways, common areas, walls, computing devices, printers, display screens, telephones, rooms of a building, security systems, network devices, and other types of resources. In some specific examples, metadata can include access codes and operational parameters one or more computing devices. In other examples, metadata can describe the contents of a room, an organizational chart associating individuals of the company with individual offices, or any other resource. Metadata can also describe a position and/or size of one or more resources. The control data, for instance, can comprise instructions, commands or other code for controlling computing devices or systems, such as security systems, elevator doors, secured doors, etc. Metadata can also include positioning data indicating a position of a user or resource. For example, metadata can indicate a position of a particular user, a group of users, a printer, a computer display screens, telephones, rooms of a building, security systems, network devices, and other types of resources. The metadata can also indicate a threshold level of accuracy with respect to the position of a user or resource. The metadata can also indicate a predetermined pattern of movement that the authentication system 115 utilizes when authenticating a user.

In some configurations, the metadata can include map data defining aspects of buildings or other structures. For instance, indoor map data 117A generated by the mapping system 110 can define aspects of an indoor environment 102, e.g., locations of walls, doorways, pathways, or other points of interest of a structure. The outdoor map data can also define aspects of an outdoor space, e.g., roads and other types of travel paths within a geographic area.

Metadata 117B-1 includes information that identifies the room as a hallway that has a size of 5 feet wide by 100 feet long. Metadata 117B-2 includes information that identifies that the room is an office, user 101B occupies the office, the office has a size of 12×12, there is one computing device within the office, and the authentication system 115 utilizes a first predetermined pattern of movement. For example, the authentication system 115 may instruct a user 101 to perform a gesture before utilizing the PC in the office. Metadata 117B-3 includes information that identifies that the room is an office, user 101A occupies the office, the office has a size of 12×10, there is one computing device within the office, and the authentication system 115 utilizes a second predetermined pattern of movement (e.g., enter the office from a particular direction, touch the wall in the office, and the like). Metadata 117B-4 includes information that identifies that the room is an office, user 101C occupies the office, the office has a size of 12×10, there is one computing device within the office, and the authentication system 115 utilizes the first predetermined pattern of movement.

In some configurations, the mapping system 110 identifies the occupant of an office based on the movement patterns identified in the positioning data 142. For example, the positioning data 142 may indicate that user 101B enters and exits room number 1002 the most often and spends the most time within the office. Metadata 117B-5 includes information that identifies the room as a hallway that has a size of 4 feet wide by 100 feet long. Metadata 117B-6 includes information that identifies the resource as a conference room, the room number, the size of the conference room is 30×20, there is a 55 inch display, a conference room table that seats six within the conference room, and the authentication system 115 utilizes a third predetermined pattern of movement for authentication of a user. Metadata 117B-7 includes information that identifies the resource as a television that is 4 feet wide. Metadata 117B-8 includes information that identifies the resource as an exterior three-foot doorway that has controlled access.

Figure 2:
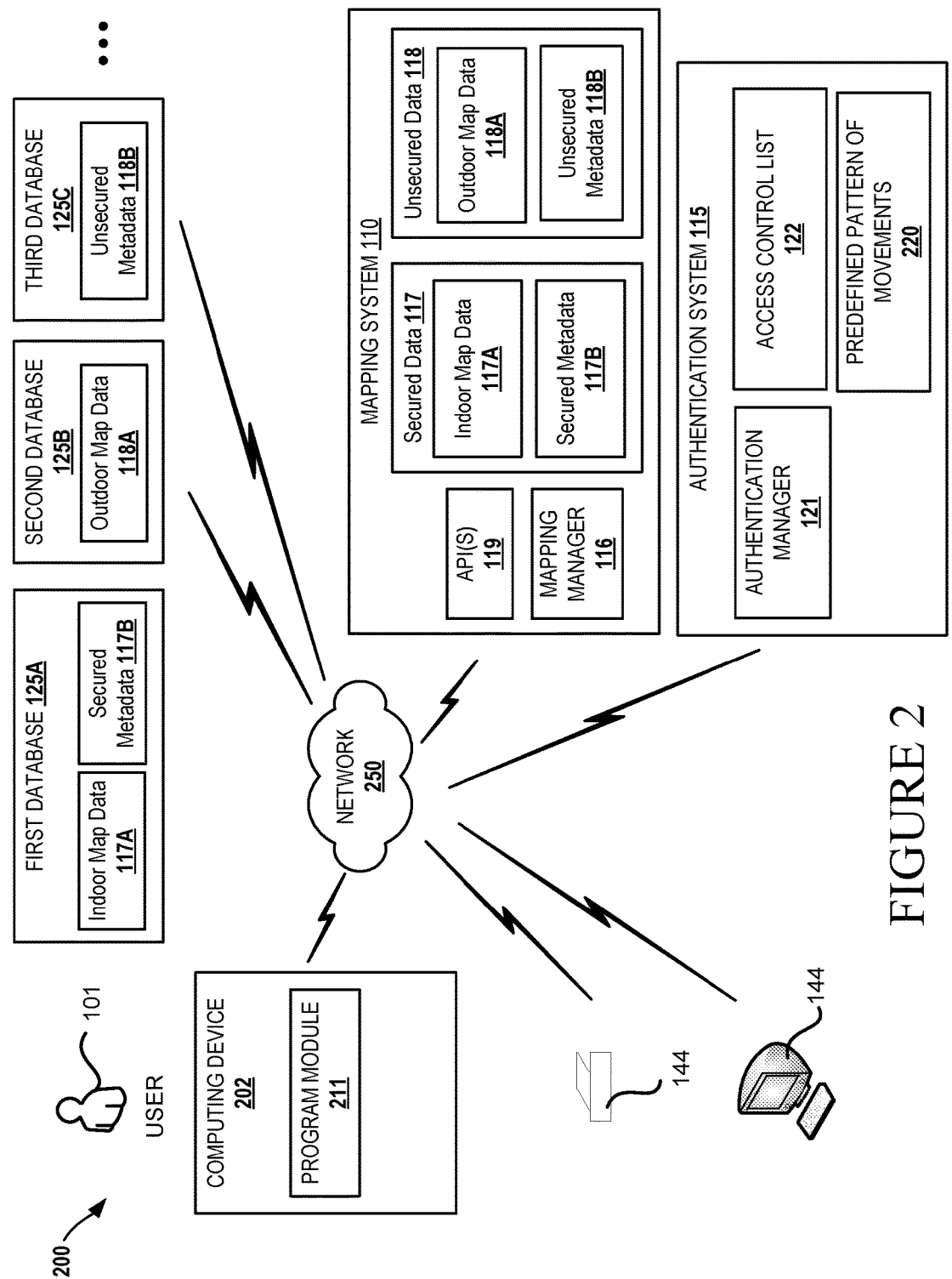
FIG. 2 is a diagram showing an illustrative system for multi-factor authentication.

Referring now to FIG. 2, aspects of a system 200 for multi-factor authentication using positioning data is provided. It should be appreciated that the subject matter described herein can be implemented as a computer-controlled apparatus, a computer process, a computing system, or as an article of manufacture such as a computer-readable storage medium. These and various other features will be apparent from a reading of the following Detailed Description and a review of the associated drawings. Furthermore, the claimed subject matter is not limited to implementations that solve any or all disadvantages noted in any part of this disclosure.

As will be described in more detail herein, it can be appreciated that implementations of the techniques and technologies described herein may include the use of solid state circuits, digital logic circuits, computer component, and/or software executing on one or more devices. Signals described herein may include analog and/or digital signals for communicating a changed state, movement and/or any data associated with motion detection. Gestures, e.g., which can be in the form of any type of movement, captured by users of the computing devices can use any type of sensor or input device.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

By the use of the technologies described herein, a system can generate permission data based on multi-factor authentication using positioning data. Such technologies can improve the security of various resources. Configurations disclosed herein can be beneficial in assisting users and business entities by providing more security to protect secure resources. Among many benefits provided by the technologies described herein, the security of resources within an indoor or outdoor environment may be improved, which may reduce the risk of secure data being accessed, or allow an operation to be performed that risks security for an organization. Other technical effects other than those mentioned herein can also be realized from implementations of the technologies disclosed herein.

In the following description, references are made to the accompanying drawings that form a part hereof, and in which are shown by way of illustration specific configurations or examples. Referring to the system drawings, in which like numerals represent like elements throughout the several figures, aspects of a computing system, computer-readable storage medium, and computer-implemented methodologies for providing multi-factor authentication using positioning data. As will be described in more detail below with respect to FIGS. 5-7, there are a number of applications and services that can embody the functionality and techniques described herein.

FIG. 2 is a block diagram showing aspects of one example system 200 disclosed herein for multi-factor authentication using positioning data. In one illustrative example, the example system 200 can include a mapping system 110, an authentication system 115, one or more client computing devices 202A-202B ("devices 202"), one or more database systems 125A-125B (generically referred to as "database systems 125"), and one or more networks 250. As will be described below, the devices 202 can be utilized for interaction with one or more users 101A-101B ("users 101"). As described above, user computing devices are associated with providing positioning data 142 to the mapping system 110. This example is provided for illustrative purposes and is not to be construed as limiting. It can be appreciated that the system 200 can include any number of devices, database systems, users, mapping systems, and/or any number of authentication systems.

The system 200 enables the client computing devices 202 to interact with a uniform interface for accessing different types of data that is stored in different database systems 125 and providing data to one or more systems associated with the mapping system 110. By providing a uniform interface, enabling users and clients to store and retrieve data from multiple noncontiguous databases with a single query, even if the database systems 125 are heterogeneous. In some configurations, a federated database system can decompose a query generated by a client computing device 202 into subqueries for submission to the relevant constituent database management systems, after which the system can composite the result sets of the subqueries. Because various database management systems can employ different query languages, the database systems 125 or the mapping system 110 can apply wrappers to the subqueries to translate them into the appropriate query languages.

For illustrative purposes, in the example shown in FIG. 2, the first database system 125A is a secured system storing indoor map data and metadata, the second database system 125B is a publicly accessible system, such as GOOGLE MAPS, storing outdoor map data, and the third database system 125C is another publicly accessible system, such as a generic search engine, social network, or ecommerce site, storing metadata. In some examples, metadata can include positioning data, which can indicate a position of a resource or user. When a client computing device 202 sends a request for data stored at the database systems 125, the authentication system 115 can determine if the client computing device 202 is to receive the requested data. The authentication system 115 can also be used to authenticate a client computing device 202 before the client computing device 202 is allowed to provide positioning data to the mapping system 110.

In some configurations, the mapping system 110, authentication system 115, and individual databases can be independently managed and/or administered by different business entities or different departments of an entity. For instance, administrative control of the mapping system 110 may be separated from the administrative control of the authentication system 115 by a management separation, staffing separation, or another arrangement where individuals or entities managing or controlling each data store do not overlap. In addition, administrative control of the individual database systems can each be separated from one another. Separation of the administrative control of each data store and the other components of the system 200 helps mitigate security concerns.

For illustrative purposes, the client computing device 202 may be associated with an organization, individual, company, machine, system, service, device, or any other entity that utilizes at least one identity having credentials stored at the authentication system 115. An identity, for example, may be associated with a user account, smart card, certificate or any other form of authentication. The individual, device, business or entity associated with the client computing device 202 may subscribe to, or at least utilize, services offered by the authentication system 115 without having the need for the authentication system 115 to store private metadata, such as indoor maps and other metadata. The mapping system 110 can store the private metadata and/or retrieve the private metadata from the various database systems 125. These examples are provided for illustrative purposes and are not to be construed as limiting. It can be appreciated that the systems and devices can be combined in different ways to create a desired separation of private data depending on the type of data that is stored.

The mapping system 110, authentication system 115, devices 202, and the database systems 125, and/or any other computer configured with the features disclosed herein can be interconnected through one or more local and/or wide area networks, such as the network 250. In addition, the computing devices can communicate using any technology, such as BLUETOOTH, WIFI, WIFI DIRECT, NFC or any other suitable technology, which may include light-based, wired, or wireless technologies. It should be appreciated that many more types of connections may be utilized than described herein.

Individual devices 202 can operate as a stand-alone device, or such devices can operate in conjunction with other computers, such as the one or more servers 120. Individual computing devices can be in the form of a personal computer, mobile phone, tablet, wearable computer, including a head-mounted display (HMD) or a watch, or any other computing device having components for interacting with one or more users 101. In one illustrative example, individual devices 202 and the provider device 104 can include a local memory (FIG. 5), also referred to herein as a "computer-readable storage medium," configured to store data and code modules, such as a program module 211.

The mapping system 110, authentication system 115, and the database systems 125 can be in the form of a personal computer, a server farm, a large-scale system or any other computing system having components for processing, coordinating, collecting, storing, and/or communicating data between one or more computing devices. In one illustrative example, the servers 120 can include a local memory (FIG. 5), also referred to herein as a "computer-readable storage medium," configured to store data and code modules, such as the mapping manager 116 and the authentication module 121. The mapping system 110, authentication system 115, and the database systems 125 can also include components and services, such as the application services and shown in FIG. 6, for providing, receiving, and processing positioning data, as well as other data, and executing one or more aspects of the techniques described herein.

The authentication system 115 can operate one or more authentication services, such as MICROSOFT'S ACTIVE DIRECTORY or any other service operating an authentication protocol, such as OpenID, can be utilized to manage credentials and generate permission data for use by the mapping system. Credentials can be received at the authentication system 115 from one or more devices 202, and the authentication system 115 can generate permission data for enabling the mapping system 110 to control access to one or more resources 144 (144A-144D). In addition, the mapping system 110, authentication system 115, and the database systems 125 can provide, or have access to, one or more services such as a service offering data management software, calendaring software, or other services. As described herein, the authentication system 110 can also perform multi-authentication using positioning data 142. For instance, the authentication manager 121 can perform a multi-factor authentication for user 101 using the location of the user 101 determined using the positioning data in combination with determining that a pattern of movement 103 performed by the user 101 is consistent with a predefined pattern of movement 103 stored within the predefined pattern of movements 220. As discussed above, the authentication system 115 can utilize one or more different predetermined patterns of movement. In some examples, the predefined patterns of movements utilized by the authentication system 115 can change over time. For instance, the authentication system 115 can utilize one predefined pattern of movement (e.g., a first gesture) one day and the next day utilize a second predefined pattern of movement (e.g., a second gesture).

In some configurations, the mapping system 110 comprises an application programming interface 119 ("API 119") that exposes an interface through which an operating system and application programs executing on the computing device can enable the functionality disclosed herein. Through the use of this data interface and other interfaces, the operating system and application programs can communicate and process data.

In some configurations, specific portions of data can be secured by associating permission levels with one or more categories of data. In some examples, the system 200 shown in FIG. 2 comprises a first category of data having a first level of access, e.g., secured data 117, and a second category of data having a second level of access, e.g., unsecured data 118.

To illustrate aspects of this example, secured data 117 includes indoor map data 117A and secured metadata 117B. The unsecured data 118 includes outdoor map data 118A and unsecured metadata 118B. The metadata can include positioning data 142, which can indicate a position of a resource or user. In this example, the indoor map data 117A and secured metadata 117B are generated by the mapping system 110 and provided to the first database system 125A, e.g., a privately managed system. The outdoor map data 118A is provided by a second database system 125B, e.g., a publicly available system, and the unsecured metadata 118B is provided by a third database system 125C, e.g., a search engine, social network, etc. This example is provided for illustrative purposes and is not to be construed as limiting. It can be appreciated that any number of levels can be associated with any portion of data to enable granular levels of access for an identity, e.g., a user associated with an account, or a group of identities. It can also be appreciated that different types of data can come from more or fewer computing devices.

The authentication system 115 can enable controlled access to one or more resources and/or portions of data by authenticating users and associating identities with entries defining roles and/or privileges. The roles and/or privileges allow or deny the execution of operations to access and/or manage data for the one or more associated identities. Among many other implementations, techniques described herein utilize the access control list 122 and an authentication manager 121 to manage granular levels of access control to different types of data. For instance, the system 115 can allow one identity, or a first group of identities, to access secured resources using a first set of authentication procedures, while using a different set of authentication procedures for a second identity, or a second group of identities.

In some examples, the techniques disclosed herein can provide different levels of access to different individuals or groups of individuals. For instance, a first level of access can be granted for full-time employees of a company, and a second level of access can be granted for vendors or contractors. In the examples described below, access to secured data and other resources are granted to an individual identity.

It can be appreciated that the techniques disclosed herein can also grant access to secured data and other resources to groups of identities.

Figure 3A:
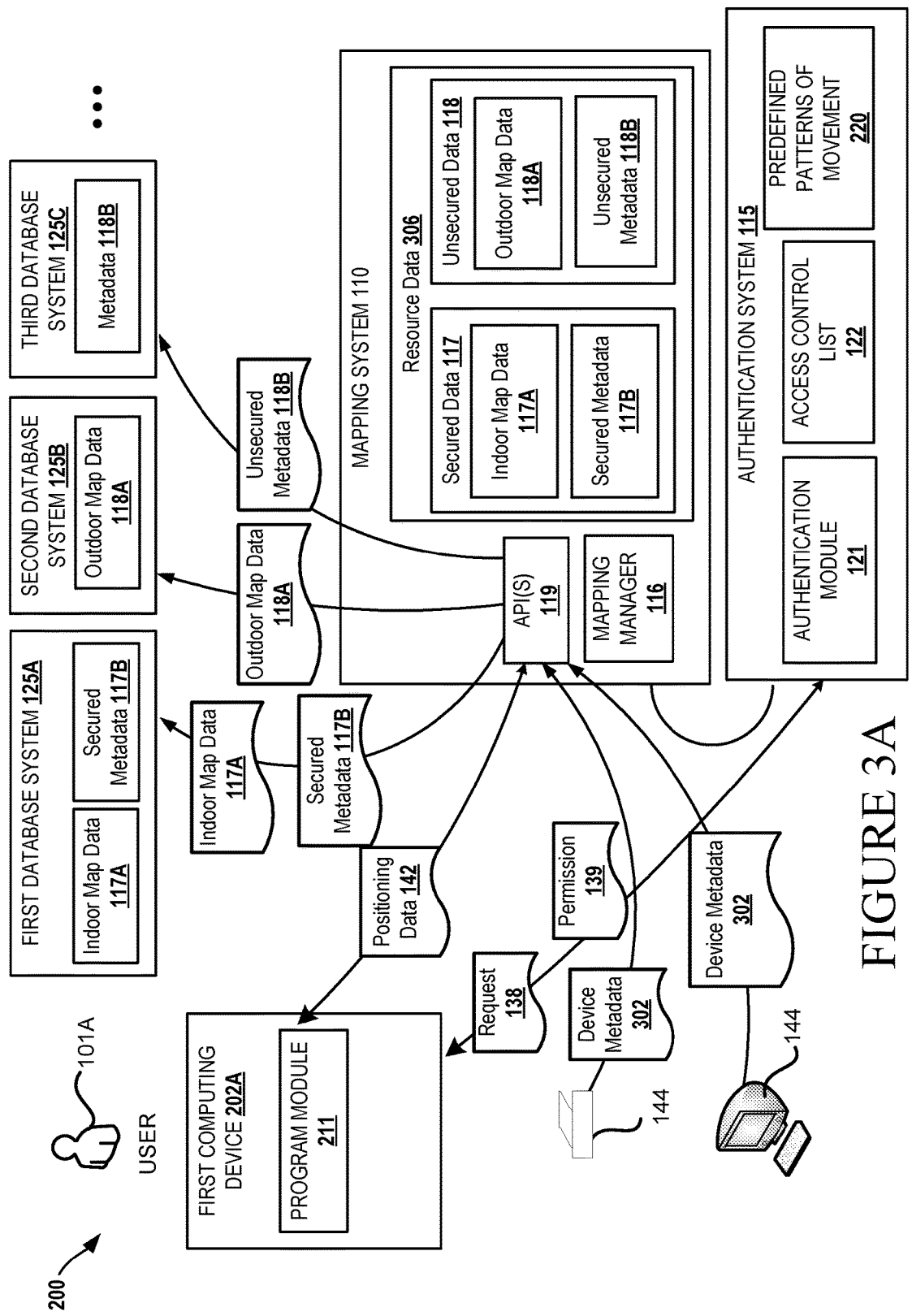
FIGS. 3A-3B illustrate an example data flow scenario of a system that provides multi-factor authentication using positioning data received from user computing devices.
Figure 3B:
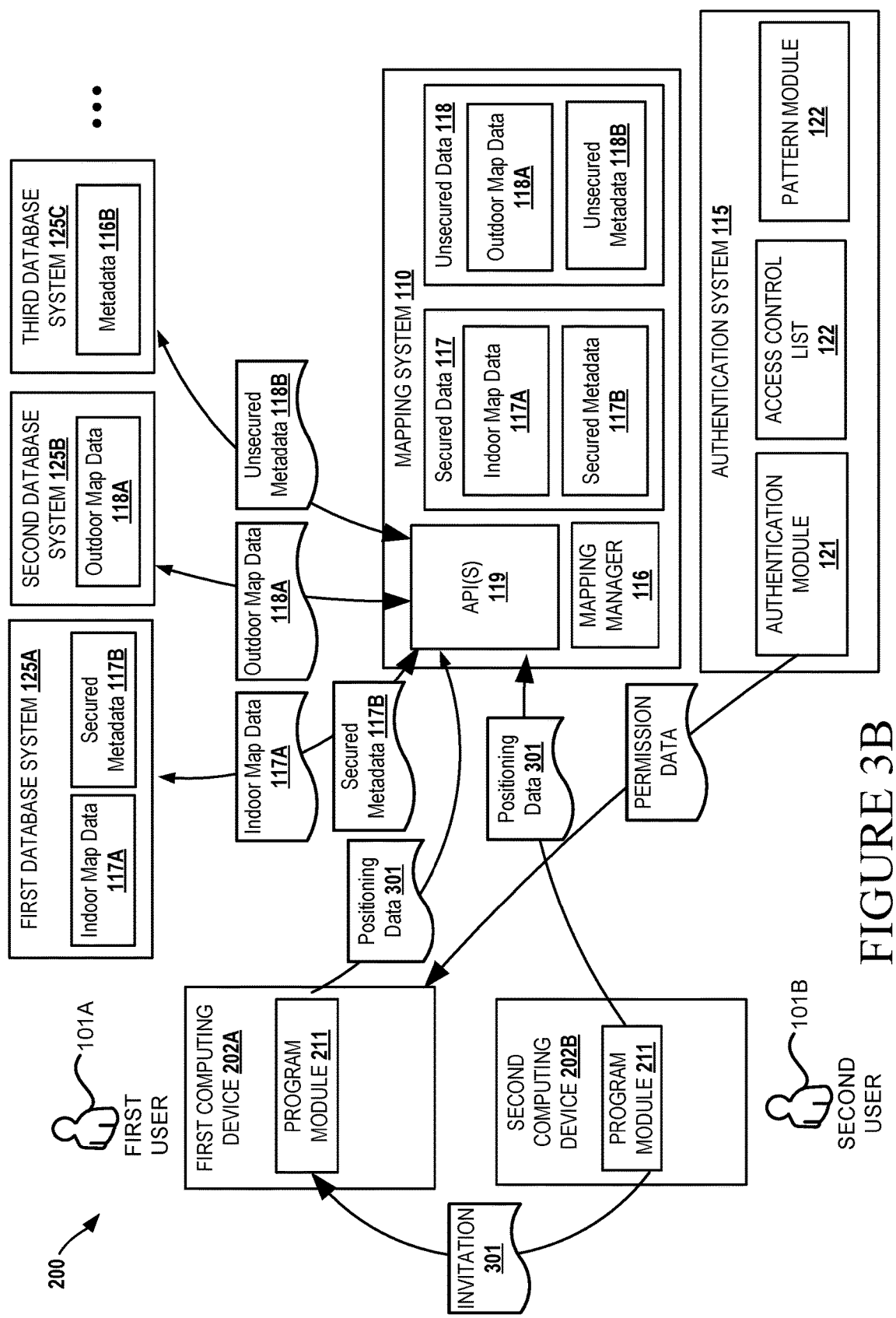

Referring now to FIGS. 3A-3B, an example data flow scenario involving the system 200 for multi-factor authentication using positioning data is shown and described below. The example shown in FIGS. 3A-3B illustrates aspects of various types of data that is exchanged between computing devices of the system 200 in the scenario illustrated above with respect to FIGS. 1A-1B.

FIG. 3A illustrates that data, which may include secured data 117 and unsecured data 118, can be received from a number of database systems 125. Specifically, the indoor map data 117A and secured metadata 117B is generated, or otherwise obtained, by the mapping system 110 and provided to the first database system 125A. The outdoor map data 118A is provided by the second database system 125B, and the unsecured metadata 118B is provided by the third database system 125C. In this example, the first database system 125A can be a privately managed server, and the second database system 125B and the third database system 125C can be publicly accessible services, e.g., search engines, social networks, etc.

In this example, the user 101A utilizes first computing device 202A to provide positioning data 142 to the mapping system 110 using one or more of the API(s) 119. As described above, users can provide positioning data to the mapping system 110 that indicates patterns of movement of the user and interactions the user has with one or more resources within the environment. After generating or obtaining the indoor map data, the mapping system 110 may store the indoor map data 117A and metadata 117B within resource data 306. The mapping system 110 can also provide the indoor map data 117A and the secured metadata 117B to the first database system 125A. The mapping system 110 can also provide map data, such as outdoor map data, to the second database system 125B and unsecured metadata 118B to the third database system 125C.

Also, as shown in FIG. 3A, the resources 144 provide device metadata 302 to the mapping system via the API(s) 119. According to some configurations, the resources can provide the device metadata during an initialization process, or at some other time. In other examples, the mapping system 110 can perform a network discovery technique to identify devices connected to a network associated with the indoor environment 102. The device metadata 302 can define information such as, but not limited to, a device identifier, a type of device, a version of the device, and the like.

For example, techniques disclosed herein can enable a computing system to receive positioning data from user computing devices. The system can generate the indoor map data 117A using the positioning data 142 using one or more mapping techniques. For example, the movement patterns 103 can be analyzed to determine boundaries of rooms and other physical objects.

As described above, the indoor map data 117A can identify resources of the indoor environment. The resources can include computing device resources and non-computing device resources within the indoor environment. For example, the map data can identify interior pathways, doorways, rooms, or other areas within the indoor environment, as well as computing resources and non-computing resources.

In some configurations, the first computing device 202A can continue to provide positioning data 142 after the indoor map data 117A is generated. This additional data can be used by the system to dynamically modify the generated indoor map data 117A based on positioning data received after generating the map data. For example, the map data may not initially indicate the presence of a resource within the indoor environment.

This positioning data 142 can also be used by the authentication system 115 when authenticating the user 101A. For example, first computing device 202A associated with user 101A may send an authentication request 138 to the authentication system 115 requesting access to a secured resource. As described above, the authentication system 115 can utilize the positioning data 142 to determine a location of the user 101A, determine a pattern of movement 103 performed by the user, and use the location and the pattern of movement when authenticating the user.

Turning now to FIG. 3B, information associated with an invitation sent by a second user 101B to a first user 101A is used by the authentication system 115 when authenticating a user. In the example illustrated in FIG. 3B, user 101A receives an invitation 301 from the second user 101B to attend a meeting at a conference room. In some configurations, the invitation 301 can be in the form of a calendar event identifying a location, e.g., the conference room. In such an example, the invitation 301 can be communicated from the second computing device 202B to the first computing device 202A, either directly or through a service, such as a calendaring service. In some configurations, the invitation 301 can be communicated to the mapping system 110. This example is provided for illustrative purposes and is not be construed as limiting. It can be appreciated that the invitation 301 can be and other forms, such as an email, text message, and instant message or any other form of communication suitable for identifying a location and identifying an identity associated with permissions for granting access to resources.

When the user 101A requests access to a secured resource associated with a resource in the room where the meeting is held, at the time of the meeting, and while the user 101A is within the room, the authentication system 115 can authorize the user 101A to access the resource. For instance, the invitation 301 can be used by the authentication system 115 to correlate that the user is attending a meeting at a particular time and at a particular location. These examples are provided for illustrative purposes and are not be construed as limiting. It can be appreciated that any suitable user activity or pattern of movement can be utilized to modify permissions associated with one or more resources.

Figure 4:
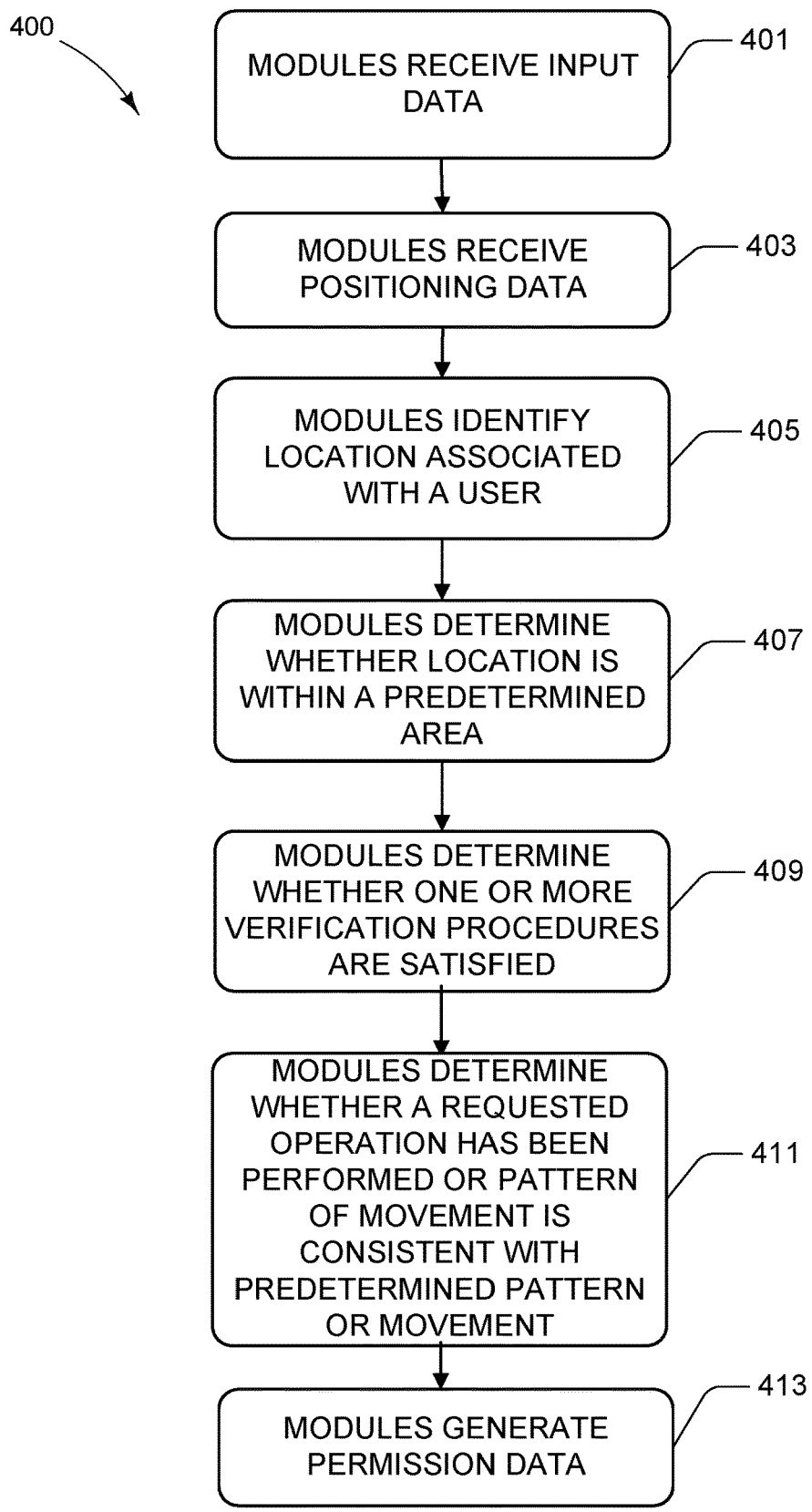
FIG. 4 is a flow diagram showing a routine illustrating aspects of a mechanism disclosed herein for multi-factor authentication.

Turning now to FIG. 4, aspects of a routine 400 for multi-factor authentication using positioning data are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 400 are described herein as being implemented, at least in part, by an authentication system 115, a mapping system 110, a program module 211, and/or components of an operating system. In some configurations, the authentication system 115 including the authentication manager 121, the mapping system 110 including the mapping manager 116 or another module running the features disclosed herein can be a dynamically linked library (DLL), a statically linked library, functionality produced by an application programing interface (API), a compiled program, an interpreted program, a script or any other executable set of instructions. Data, such as positioning data 142, and other data can be stored in a data structure in one or more memory components. Data can be retrieved from the data structure by addressing links or references to the data structure.

Although the following illustration refers to the components of the figures, it can be appreciated that the operations of the routine 400 may be also implemented in many other ways. For example, the routine 400 may be implemented, at least in part, by a processor of another remote computer or a local circuit. In addition, one or more of the operations of the routine 400 may alternatively or additionally be implemented, at least in part, by a chipset working alone or in conjunction with other software modules. In the example described below, one or more modules of a computing system, such as the mapping system 110 can receive and/or process the data disclosed herein. Any service, circuit or application suitable for providing the techniques disclosed herein can be used in operations described herein.

With reference to FIG. 4, the routine 400 begins at operation 401 where one or more modules of a computing system receive input data. As discussed above, the authentication system 115 can receive a request from a user 101 that requires authentication before the user can access a secured resource, such as secured data, or perform some other operation that requires authentication.

Next, at operation 403, one or more modules of a computing system can receive positioning data 143. As discussed above, the positioning data 142 can include data associated with the movement of a user within an indoor environment, such as movement of users inside a building. In some examples, mobile computing devices associated with users provide to the mapping system 110, positioning data 142 that includes velocity data and direction data for users moving within the indoor environment. Positioning data 142 may be received from computing devices 202 associated with the one or more identities or the positioning data 142 can be received from another system, which may have cameras and other devices that can track movement of individuals.

Next, at operation 405, one or more modules of a computing system can identify a location of a user. As summarized above, the authentication system 115 can request a location of the user from the mapping system 110. The mapping system 110 can access the map data 117A to determine the location of the user within the environment 102.

Next, at operation 407, one or more modules of a computing system can determine whether the location is within a predetermined area. As summarized herein, the authentication system 115 can use the location as one of the factors in the multi-factor authentication for the user 101. For instance, the authentication system 115 may generate permission data allowing the user to access secure data while the user remains within a particular area.

Next, at operation 409, one or more modules of a computing device can determine whether one or more verification procedures are satisfied. As summarized herein, the authentication system 115 can use a variety of different verification procedures when determining whether to authenticate a user. In some examples, the authentication procedures are satisfied when one or more criteria associated with the verification procedure are met.

Next, at operation 411, one or more modules of a computing device can determine whether the user has performed a requested operation (e.g., taking a picture at the location), or that a pattern of movement 103 associated with a user 101 is consistent with a predetermined pattern of movement. As discussed above, the authentication system 115 can determine whether the user 101 requesting authentication has performed the requested operation of the predetermined pattern of movement is consistent.

Next, at operation 413, one or more modules of a computing device can generate permission data 139 allowing the user to access the secure data and/or perform a secure operation. As summarized herein, the authentication system 115 can generate permission data that restricts the user 101 from accessing the secure data and/or perform the secure operation in response to one or more conditions of the authentication changing (e.g., the user moving to a different area).

Figure 5:
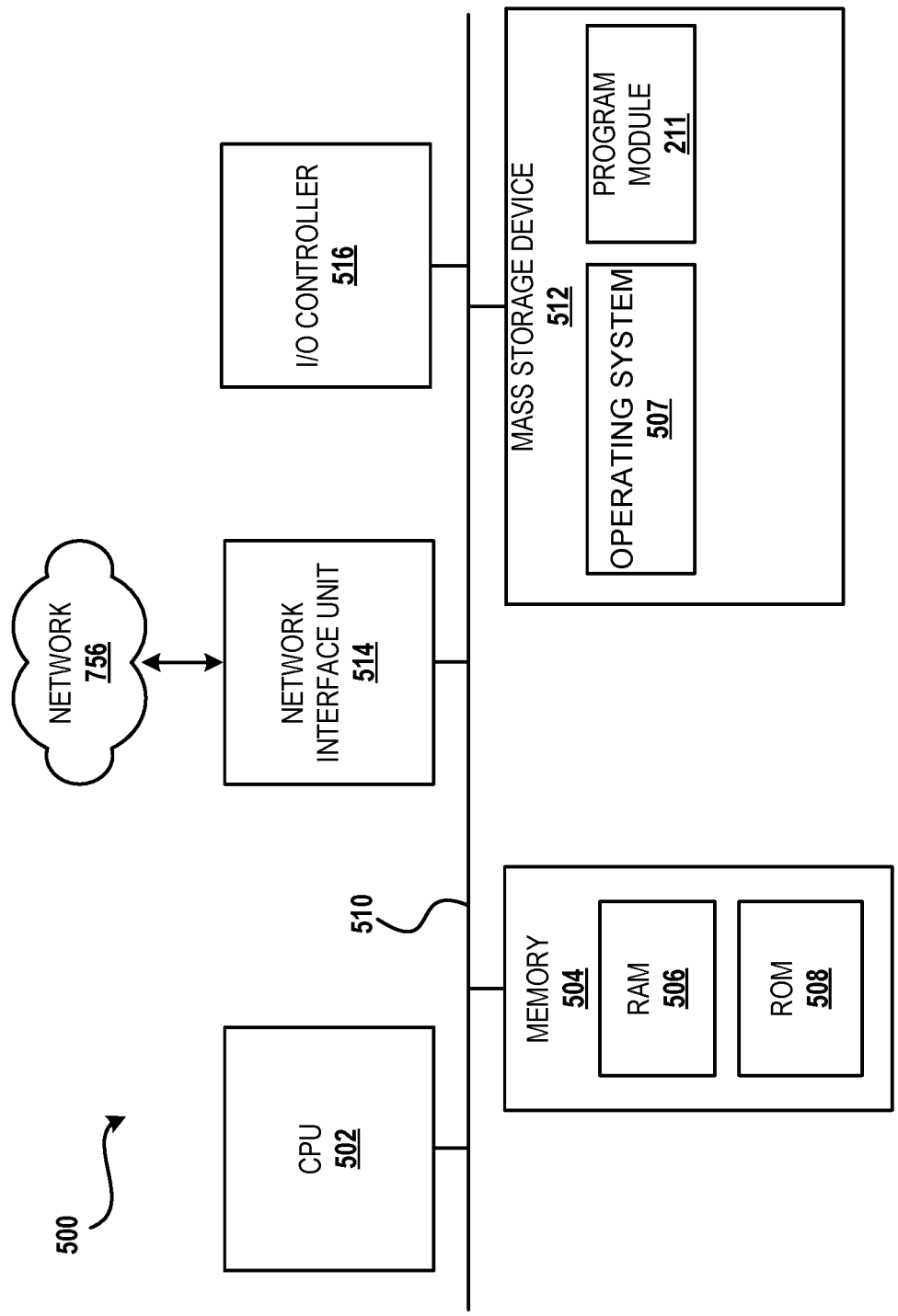
FIG. 5 is a computer architecture diagram illustrating an illustrative computer hardware and software architecture for a computing system capable of implementing aspects of the techniques and technologies presented herein.

FIG. 5 shows additional details of an example computer architecture 500 for a computer, such as the computing device 202 (FIG. 2), capable of executing the program components described herein. Thus, the computer architecture 500 illustrated in FIG. 5 illustrates an architecture for a server computer, mobile phone, a PDA, a smart phone, a desktop computer, a netbook computer, a tablet computer, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing an operating system 507, other data, and one or more application programs.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium," "computer-readable storage medium" and variations thereof, does not include waves, signals, and/or other transitory and/or intangible communication media, per se.

According to various configurations, the computer architecture 500 may operate in a networked environment using logical connections to remote computers through the network 756 and/or another network (not shown). The computer architecture 500 may connect to the network 756 through a network interface unit 514 connected to the bus 510. It should be appreciated that the network interface unit 514 also may be utilized to connect to other types of networks and remote computer systems. The computer architecture 500 also may include an input/output controller 516 for receiving and processing input from a number of other devices, including a keyboard, mouse, or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Figure 6:
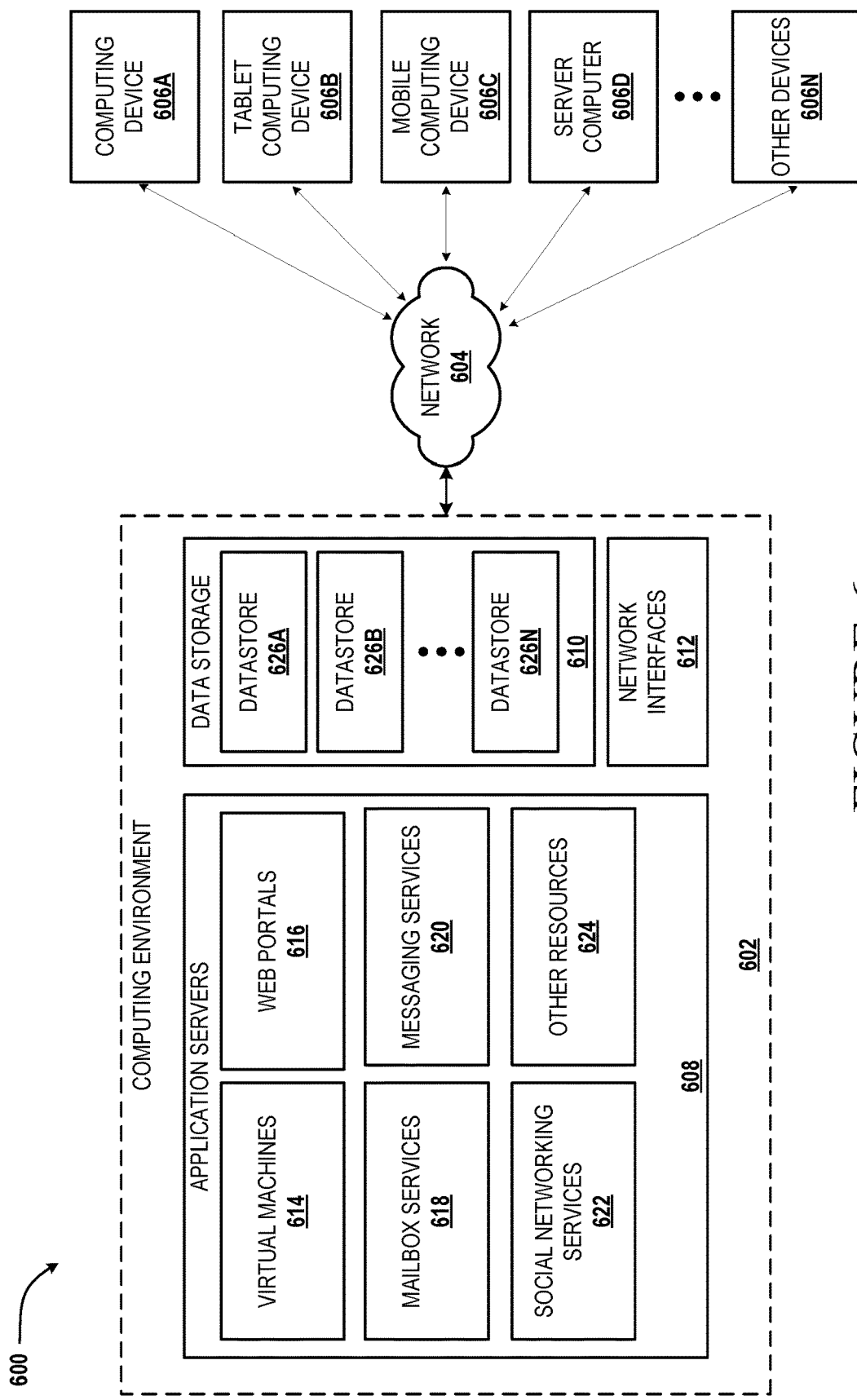
FIG. 6 is a diagram illustrating a distributed computing environment capable of implementing aspects of the techniques and technologies presented herein.

FIG. 6 depicts an illustrative distributed computing environment 600 capable of executing the software components described herein for multi-factor authentication using positioning data. Thus, the distributed computing environment 600 illustrated in FIG. 6 can be utilized to execute any aspects of the software components presented herein. For example, the distributed computing environment 600 can be utilized to execute aspects of the software components described herein.

According to various implementations, the distributed computing environment 600 includes a computing environment 602 operating on, in communication with, or as part of the network 604. The network 604 may be or may include the network 756, described above with reference to FIG. 5. The network 604 also can include various access networks. One or more client devices 606A-606N (hereinafter referred to collectively and/or generically as "clients 606") can communicate with the computing environment 602 via the network 604 and/or other connections (not illustrated in FIG. 6). In one illustrated configuration, the clients 606 include a computing device 606A such as a laptop computer, a desktop computer, or other computing device; a slate or tablet computing device ("tablet computing device") 606B; a mobile computing device 606C such as a mobile telephone, a smart phone, or other mobile computing device; a server computer 606D; and/or other devices 606N. It should be understood that any number of clients 606 can communicate with the computing environment 602. Two example computing architectures for the clients 606 are illustrated and described herein with reference to FIGS. 5 and 7. It should be understood that the illustrated clients 606 and computing architectures illustrated and described herein are illustrative, and should not be construed as being limited in any way.

In the illustrated configuration, the computing environment 602 includes application servers 608, data storage 610, and one or more network interfaces 612. According to various implementations, the functionality of the application servers 608 can be provided by one or more server computers that are executing as part of, or in communication with, the network 604. The application servers 608 can host various services, virtual machines, portals, and/or other resources. In the illustrated configuration, the application servers 608 host one or more virtual machines 614 for hosting applications or other functionality. According to various implementations, the virtual machines 614 host one or more applications and/or software modules for multi-factor authentication using positioning data. It should be understood that this configuration is illustrative, and should not be construed as being limiting in any way. The application servers 608 also host or provide access to one or more portals, link pages, Web sites, and/or other information ("Web portals") 616.

According to various implementations, the application servers 608 also include one or more mailbox services 618 and one or more messaging services 620. The mailbox services 618 can include electronic mail ("email") services. The mailbox services 618 also can include various personal information management ("PIM") and presence services including, but not limited to, calendar services, contact management services, collaboration services, and/or other services. The messaging services 620 can include, but are not limited to, instant messaging services, chat services, forum services, and/or other communication services.

The application servers 608 also may include one or more social networking services 622. The social networking services 622 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 622 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 622 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 622 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 622 are not mentioned herein for the sake of brevity. As such, the above configurations are illustrative, and should not be construed as being limited in any way. According to various implementations, the social networking services 622 may host one or more applications and/or software modules for providing the functionality described herein, such as providing multi-factor authentication using positioning data. For instance, any one of the application servers 608 may communicate or facilitate the functionality and features described herein. For instance, a social networking application, mail client, messaging client or a browser running on a phone or any other client 606 may communicate with a networking service 622 and facilitate the functionality, even in part, described above with respect to FIG. 4.

As shown in FIG. 6, the application servers 608 also can host other services, applications, portals, and/or other resources ("other resources") 624. The other resources 624 can include, but are not limited to, document sharing, rendering or any other functionality. It thus can be appreciated that the computing environment 602 can provide integration of the concepts and technologies disclosed herein provided herein with various mailbox, messaging, social networking, and/or other services or resources.

As mentioned above, the computing environment 602 can include the data storage 610. According to various implementations, the functionality of the data storage 610 is provided by one or more databases operating on, or in communication with, the network 604. The functionality of the data storage 610 also can be provided by one or more server computers configured to host data for the computing environment 602. The data storage 610 can include, host, or provide one or more real or virtual datastores 626A-626N (hereinafter referred to collectively and/or generically as "datastores 626"). The datastores 626 are configured to host data used or created by the application servers 608 and/or other data. Although not illustrated in FIG. 6, the datastores 626 also can host or store web page documents, word documents, presentation documents, data structures, algorithms for execution by a recommendation engine, and/or other data utilized by any application program or another module. Aspects of the datastores 626 may be associated with a service for storing files.

The computing environment 602 can communicate with, or be accessed by, the network interfaces 612. The network interfaces 612 can include various types of network hardware and software for supporting communications between two or more computing devices including, but not limited to, the clients 606 and the application servers 608. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 600 provides the software functionality described herein as a service to the clients 606. It should be understood that the clients 606 can include real or virtual machines including, but not limited to, server computers, web servers, personal computers, mobile computing devices, smart phones, and/or other devices. As such, various configurations of the concepts and technologies disclosed herein enable any device configured to access the distributed computing environment 600 to utilize the functionality described herein for providing multi-factor authentication using positioning data, among other aspects. In one specific example, as summarized above, techniques described herein may be implemented, at least in part, by the web browser application 510 of FIG. 5, which works in conjunction with the application servers 608 of FIG. 6.

Figure 7:
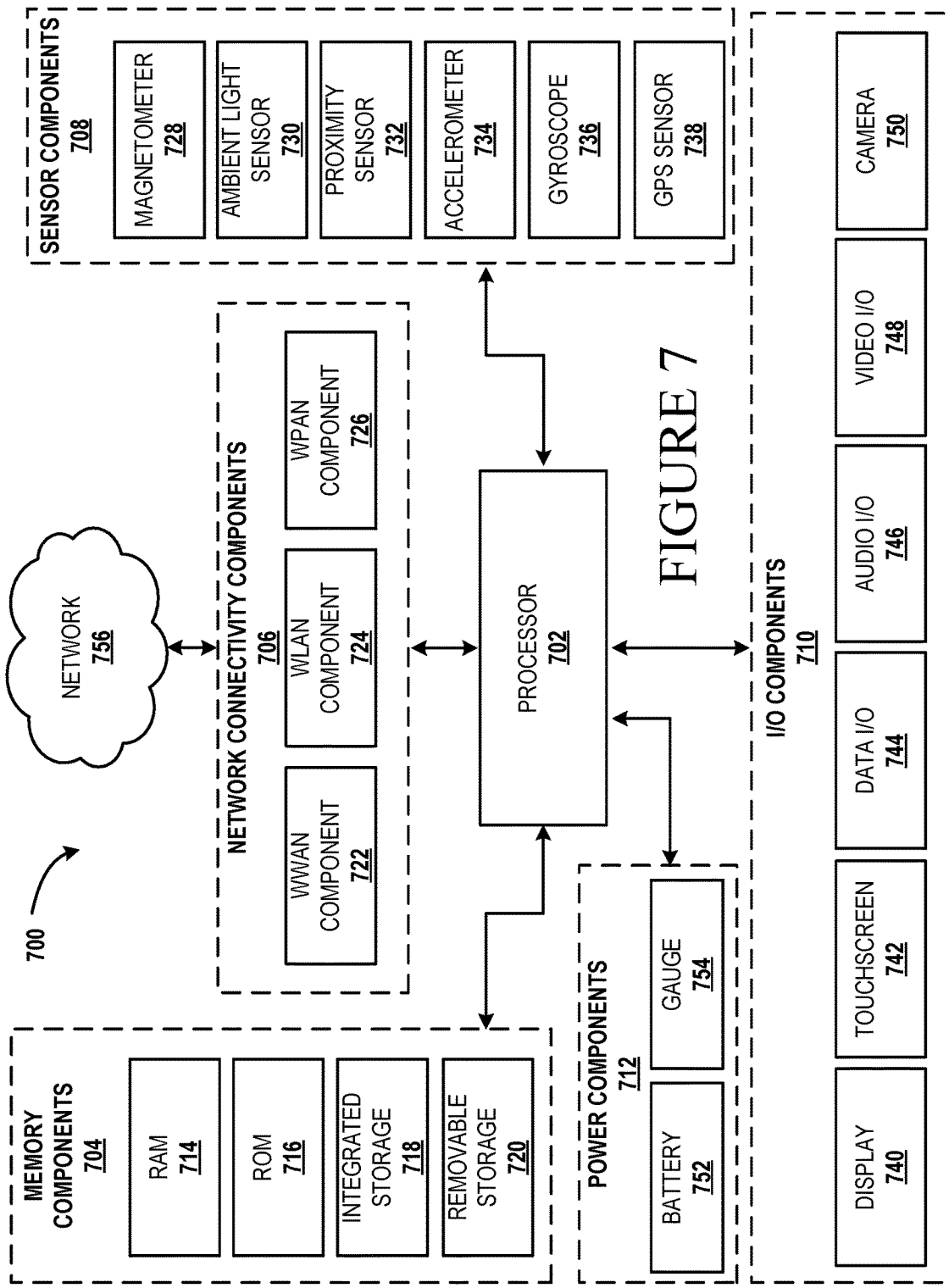
FIG. 7 is a computer architecture diagram illustrating a computing device architecture for a computing device capable of implementing aspects of the techniques and technologies presented herein.

Turning now to FIG. 7, an illustrative computing device architecture 700 for a computing device that is capable of executing various software components described herein for providing multi-factor authentication using positioning data. The computing device architecture 700 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 700 is applicable to any of the clients 606 shown in FIG. 6. Moreover, aspects of the computing device architecture 700 may be applicable to traditional desktop computers, portable computers (e.g., phones, laptops, notebooks, ultra-portables, and netbooks), server computers, and other computer systems, such as described herein with reference to FIG. 5. For example, the single touch and multi-touch aspects disclosed herein below may be applied to desktop computers that utilize a touchscreen or some other touch-enabled device, such as a touch-enabled track pad or touch-enabled mouse.

The computing device architecture 700 illustrated in FIG. 7 includes a processor 702, memory components 704, network connectivity components 706, sensor components 708, input/output components 710, and power components 712. In the illustrated configuration, the processor 702 is in communication with the memory components 704, the network connectivity components 706, the sensor components 708, the input/output ("I/O") components 710, and the power components 712. Although no connections are shown between the individuals components illustrated in FIG. 7, the components can interact to carry out device functions. In some configurations, the components are arranged so as to communicate via one or more busses (not shown).

The processor 702 includes a central processing unit ("CPU") configured to process data, execute computer-executable instructions of one or more application programs, and communicate with other components of the computing device architecture 700 in order to perform various functionality described herein. The processor 702 may be utilized to execute aspects of the software components presented herein and, particularly, those that utilize, at least in part, a touch-enabled input.

In some configurations, the processor 702 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 702 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 702 is, or is included in, a system-on-chip ("SoC") along with one or more of the other components described herein below. For example, the SoC may include the processor 702, a GPU, one or more of the network connectivity components 706, and one or more of the sensor components 708. In some configurations, the processor 702 is fabricated, in part, utilizing a package-on-package ("PoP") integrated circuit packaging technique. The processor 702 may be a single core or multi-core processor.

The processor 702 may be created in accordance with an ARM architecture, available for license from ARM HOLDINGS of Cambridge, United Kingdom. Alternatively, the processor 702 may be created in accordance with an x86 architecture, such as is available from INTEL CORPORATION of Mountain View, Calif. and others. In some configurations, the processor 702 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 704 include a random access memory ("RAM") 714, a read-only memory ("ROM") 716, an integrated storage memory ("integrated storage") 718, and a removable storage memory ("removable storage") 720. In some configurations, the RAM 714 or a portion thereof, the ROM 716 or a portion thereof, and/or some combination the RAM 714 and the ROM 716 is integrated in the processor 702. In some configurations, the ROM 716 is configured to store a firmware, an operating system or a portion thereof (e.g., operating system kernel), and/or a bootloader to load an operating system kernel from the integrated storage 718 and/or the removable storage 720.

The integrated storage 718 can include a solid-state memory, a hard disk, or a combination of solid-state memory and a hard disk. The integrated storage 718 may be soldered or otherwise connected to a logic board upon which the processor 702 and other components described herein also may be connected. As such, the integrated storage 718 is integrated in the computing device. The integrated storage 718 is configured to store an operating system or portions thereof, application programs, data, and other software components described herein.

The removable storage 720 can include a solid-state memory, a hard disk, or a combination of solid-state memory and a hard disk. In some configurations, the removable storage 720 is provided in lieu of the integrated storage 718. In other configurations, the removable storage 720 is provided as additional optional storage. In some configurations, the removable storage 720 is logically combined with the integrated storage 718 such that the total available storage is made available as a total combined storage capacity. In some configurations, the total combined capacity of the integrated storage 718 and the removable storage 720 is shown to a user instead of separate storage capacities for the integrated storage 718 and the removable storage 720.

The removable storage 720 is configured to be inserted into a removable storage memory slot (not shown) or other mechanism by which the removable storage 720 is inserted and secured to facilitate a connection over which the removable storage 720 can communicate with other components of the computing device, such as the processor 702. The removable storage 720 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 704 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 706 include a wireless wide area network component ("WWAN component") 722, a wireless local area network component ("WLAN component") 724, and a wireless personal area network component ("WPAN component") 726. The network connectivity components 706 facilitate communications to and from the network 756 or another network, which may be a WWAN, a WLAN, or a WPAN. Although only the network 756 is illustrated, the network connectivity components 706 may facilitate simultaneous communication with multiple networks, including the network 604 of FIG. 6. For example, the network connectivity components 706 may facilitate simultaneous communications with multiple networks via one or more of a WWAN, a WLAN, or a WPAN.

The network 756 may be or may include a WWAN, such as a mobile telecommunications network utilizing one or more mobile telecommunications technologies to provide voice and/or data services to a computing device utilizing the computing device architecture 700 via the WWAN component 722. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 756 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 756 may be configured to provide voice and/or data communications with any combination of the above technologies. The network 756 may be configured to or adapted to provide voice and/or data communications in accordance with future generation technologies.

In some configurations, the WWAN component 722 is configured to provide dual-multi-mode connectivity to the network 756. For example, the WWAN component 722 may be configured to provide connectivity to the network 756, wherein the network 756 provides service via GSM and UNITS technologies, or via some other combination of technologies. Alternatively, multiple WWAN components 722 may be utilized to perform such functionality, and/or provide additional functionality to support other non-compatible technologies (i.e., incapable of being supported by a single WWAN component). The WWAN component 722 may facilitate similar connectivity to multiple networks (e.g., a UMTS network and an LTE network).

The network 756 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 724 is configured to connect to the network 756 via the WI-FI access points. Such connections may be secured via various encryption technologies including, but not limited, WI-FI Protected Access ("WPA"), WPA2, Wired Equivalent Privacy ("WEP"), and the like.

The network 756 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 726 is configured to facilitate communications with other devices, such as peripherals, computers, or other computing devices via the WPAN.

The sensor components 708 include a magnetometer 728, an ambient light sensor 730, a proximity sensor 732, an accelerometer 734, a gyroscope 736, and a Global Positioning System sensor ("GPS sensor") 738. It is contemplated that other sensors, such as, but not limited to, temperature sensors or shock detection sensors, also may be incorporated in the computing device architecture 700.

The magnetometer 728 is configured to measure the strength and direction of a magnetic field. In some configurations the magnetometer 728 provides measurements to a compass application program stored within one of the memory components 704 in order to provide a user with accurate directions in a frame of reference including the cardinal directions, north, south, east, and west. Similar measurements may be provided to a navigation application program that includes a compass component. Other uses of measurements obtained by the magnetometer 728 are contemplated.

The ambient light sensor 730 is configured to measure ambient light. In some configurations, the ambient light sensor 730 provides measurements to an application program stored within one the memory components 704 in order to automatically adjust the brightness of a display (described below) to compensate for low-light and high-light environments. Other uses of measurements obtained by the ambient light sensor 730 are contemplated.

The proximity sensor 732 is configured to detect the presence of an object or thing in proximity to the computing device without direct contact. In some configurations, the proximity sensor 732 detects the presence of a user's body (e.g., the user's face) and provides this information to an application program stored within one of the memory components 704 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 732 are contemplated.

The accelerometer 734 is configured to measure proper acceleration. In some configurations, output from the accelerometer 734 is used by an application program as an input mechanism to control some functionality of the application program. For example, the application program may be a video game in which a character, a portion thereof, or an object is moved or otherwise manipulated in response to input received via the accelerometer 734. In some configurations, output from the accelerometer 734 is provided to an application program for use in switching between landscape and portrait modes, calculating coordinate acceleration, or detecting a fall. Other uses of the accelerometer 734 are contemplated.

The gyroscope 736 is configured to measure and maintain orientation. In some configurations, output from the gyroscope 736 is used by an application program as an input mechanism to control some functionality of the application program. For example, the gyroscope 736 can be used for accurate recognition of movement within a 3D environment of a video game application or some other application. In some configurations, an application program utilizes output from the gyroscope 736 and the accelerometer 734 to enhance control of some functionality of the application program. Other uses of the gyroscope 736 are contemplated.

The GPS sensor 738 is configured to receive signals from GPS satellites for use in calculating a location. The location calculated by the GPS sensor 738 may be used by any application program that requires or benefits from location information. For example, the location calculated by the GPS sensor 738 may be used with a navigation application program to provide directions from the location to a destination or directions from the destination to the location. Moreover, the GPS sensor 738 may be used to provide location information to an external location-based service, such as E911 service. The GPS sensor 738 may obtain location information generated via WI-FI, WIMAX, and/or cellular triangulation techniques utilizing one or more of the network connectivity components 706 to aid the GPS sensor 738 in obtaining a location fix. The GPS sensor 738 may also be used in Assisted GPS ("A-GPS") systems. The GPS sensor 738 can also operate in conjunction with other components, such as the processor 702, to generate positioning data for the computing device 700.

The I/O components 710 include a display 740, a touchscreen 742, a data I/O interface component ("data I/O") 744, an audio I/O interface component ("audio I/O") 746, a video I/O interface component ("video I/O") 748, and a camera 750. In some configurations, the display 740 and the touchscreen 742 are combined. In some configurations two or more of the data I/O component 744, the audio I/O component 746, and the video I/O component 748 are combined. The I/O components 710 may include discrete processors configured to support the various interface described below, or may include processing functionality built-in to the processor 702.

The display 740 is an output device configured to present information in a visual form. In particular, the display 740 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 740 is a liquid crystal display ("LCD") utilizing any active or passive matrix technology and any backlighting technology (if used). In some configurations, the display 740 is an organic light emitting diode ("OLED") display. Other display types are contemplated.

The touchscreen 742, also referred to herein as a "touch-enabled screen," is an input device configured to detect the presence and location of a touch. The touchscreen 742 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 742 is incorporated on top of the display 740 as a transparent layer to enable a user to use one or more touches to interact with objects or other information presented on the display 740. In other configurations, the touchscreen 742 is a touch pad incorporated on a surface of the computing device that does not include the display 740. For example, the computing device may have a touchscreen incorporated on top of the display 740 and a touch pad on a surface opposite the display 740.

In some configurations, the touchscreen 742 is a single-touch touchscreen. In other configurations, the touchscreen 742 is a multi-touch touchscreen. In some configurations, the touchscreen 742 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 742. As such, a developer may create gestures that are specific to a particular application program.

In some configurations, the touchscreen 742 supports a tap gesture in which a user taps the touchscreen 742 once on an item presented on the display 740. The tap gesture may be used for various reasons including, but not limited to, opening or launching whatever the user taps. In some configurations, the touchscreen 742 supports a double tap gesture in which a user taps the touchscreen 742 twice on an item presented on the display 740. The double tap gesture may be used for various reasons including, but not limited to, zooming in or zooming out in stages. In some configurations, the touchscreen 742 supports a tap and hold gesture in which a user taps the touchscreen 742 and maintains contact for at least a pre-defined time. The tap and hold gesture may be used for various reasons including, but not limited to, opening a context-specific menu.

In some configurations, the touchscreen 742 supports a pan gesture in which a user places a finger on the touchscreen 742 and maintains contact with the touchscreen 742 while moving the finger on the touchscreen 742. The pan gesture may be used for various reasons including, but not limited to, moving through screens, images, or menus at a controlled rate. Multiple finger pan gestures are also contemplated. In some configurations, the touchscreen 742 supports a flick gesture in which a user swipes a finger in the direction the user wants the screen to move. The flick gesture may be used for various reasons including, but not limited to, scrolling horizontally or vertically through menus or pages. In some configurations, the touchscreen 742 supports a pinch and stretch gesture in which a user makes a pinching motion with two fingers (e.g., thumb and forefinger) on the touchscreen 742 or moves the two fingers apart. The pinch and stretch gesture may be used for various reasons including, but not limited to, zooming gradually in or out of a web site, map, or picture.

Although the above gestures have been described with reference to the use one or more fingers for performing the gestures, other appendages such as toes or objects such as styluses may be used to interact with the touchscreen 742. As such, the above gestures should be understood as being illustrative and should not be construed as being limiting in any way.

The data I/O interface component 744 is configured to facilitate input of data to the computing device and output of data from the computing device. In some configurations, the data I/O interface component 744 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 746 is configured to provide audio input and/or output capabilities to the computing device. In some configurations, the audio I/O interface component 746 includes a microphone configured to collect audio signals. In some configurations, the audio I/O interface component 746 includes a headphone jack configured to provide connectivity for headphones or other external speakers. In some configurations, the audio I/O interface component 746 includes a speaker for the output of audio signals. In some configurations, the audio I/O interface component 746 includes an optical audio cable out.

The video I/O interface component 748 is configured to provide video input and/or output capabilities to the computing device. In some configurations, the video I/O interface component 748 includes a video connector configured to receive video as input from another device (e.g., a video media player such as a DVD or BLURAY player) or send video as output to another device (e.g., a monitor, a television, or some other external display). In some configurations, the video I/O interface component 748 includes a High-Definition Multimedia Interface ("HDMI"), mini-HDMI, micro-HDMI, DisplayPort, or proprietary connector to input/output video content. In some configurations, the video I/O interface component 748 or portions thereof is combined with the audio I/O interface component 746 or portions thereof.

The camera 750 can be configured to capture still images and/or video. The camera 750 may utilize a charge coupled device ("CCD") or a complementary metal oxide semiconductor ("CMOS") image sensor to capture images. In some configurations, the camera 750 includes a flash to aid in taking pictures in low-light environments. Settings for the camera 750 may be implemented as hardware or software buttons.

Although not illustrated, one or more hardware buttons may also be included in the computing device architecture 700. The hardware buttons may be used for controlling some operational aspect of the computing device. The hardware buttons may be dedicated buttons or multi-use buttons. The hardware buttons may be mechanical or sensor-based.

The illustrated power components 712 include one or more batteries 752, which can be connected to a battery gauge 754. The batteries 752 may be rechargeable or disposable. Rechargeable battery types include, but are not limited to, lithium polymer, lithium ion, nickel cadmium, and nickel metal hydride. Each of the batteries 752 may be made of one or more cells.

The battery gauge 754 can be configured to measure battery parameters such as current, voltage, and temperature. In some configurations, the battery gauge 754 is configured to measure the effect of a battery's discharge rate, temperature, age and other factors to predict remaining life within a certain percentage of error. In some configurations, the battery gauge 754 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 712 may also include a power connector, which may be combined with one or more of the aforementioned I/O components 710. The power components 712 may interface with an external power system or charging equipment via an I/O component.

The disclosure presented herein may be considered in view of the following clauses.

Clause A: A computer-implemented method, comprising: receiving input data indicating a request to access secured data associated with an identity; verifying a credential associated with the identity by, receiving positioning data indicating a location associated with the identity, determining that the location is within a predetermined area, determining that one or more additional verification procedures meets one or more criteria while the location associated with the identity is within the predetermined area, determining that one or more of a requested operation is performed or a pattern of movement associated with the identity is consistent with a predetermined pattern of movement, and generating permission data allowing access to the secured data.

Clause B. The computer-implemented method of Clause A, further comprising generating second permission data that revokes access to the secured data based at least in part on determining one or more of that the pattern of movement is inconsistent with the predetermined pattern of movement or that the location is outside of the predetermined area.

Clause C. The computer-implemented method of Clauses A-B, wherein receiving the positioning data comprises receiving the positioning data from a computing device associated with the identity.

Clause D. The computer-implemented method of Clauses A-C, further comprising generating second permission data that revokes access to the secured data when the location of a computing device associated with the identify is one or more of: outside of the predetermined area; when the one or more criteria of the one or more verification procedures are not met; or when a pattern of movement associated with the computing device is inconsistent with the predetermined pattern of movement.

Clause E. The computer-implemented method of Clauses A-D, wherein determining that one or more of the requested operation is performed comprises identifying a gesture performed by the user and determining that the gesture is consistent with the requested operation.

Clause F. The computer-implemented method of Clauses A-E, further comprising determining that the location associated with the identity is consistent with data indicating a planned location of the user, wherein the data indicating the planned location is based, at least in part, on an invitation to attend a meeting, wherein the invitation defines a meeting time and a name of a conference room, and wherein generating the map data comprises assigning the conference room the name.

Clause G. A system, comprising: a processor; and a memory in communication with the processor, the memory having computer-readable instructions stored thereupon that, when executed by the processor, cause the processor to receive input data associated with an authentication request of an identity; receive positioning data indicating a location of the identity; determine that the location is within a predetermined area; determine that a pattern of movement associated with the identity is consistent with a predetermined pattern of movement; and authenticate the identity based at least in part on the location, and the pattern of movement.

Clause H. The system of Clause G, wherein the instructions cause the processor to generate permission data that authorizes access to one or more of secured data or performance of an action.

Clause I. The system Clauses G-H, wherein the instructions cause the processor to generate second permission data that revokes access to the one or more of secured data or the performance of the action based at least in part on a determination that one or more verification procedures fails to meet one or more criteria while the location associated with the identity is within the predetermined area.

Clause J. The system of Clauses G-I, wherein the instructions cause the processor to generate second permission data that revokes access to the one or more of secured data or the performance of the action based at least in part on a determination that the location associated with the identity is outside of the predetermined area.

Clause K. The system of Clauses G-J, wherein determining that the pattern of movement associated with the identity is consistent with the predetermined pattern of movement comprises identifying an action performed by the user and determining that the action is consistent with the predetermined pattern of movement.

Clause L. The system of Clauses G-K, wherein identifying the action comprises identifying one or more of a gesture performed by the identity or identifying a pattern of movement performed within the predetermined area.

Clause M. The system of Clauses G-L, wherein the instructions cause the processor to determine that the location associated with the identity is consistent with data indicating a planned location of the user.

Clause N. The system of Clauses G-M, wherein the instructions cause the processor to access metadata to determine the predetermined pattern of movement.

Clause O. A computer-readable storage medium having computer-executable instructions stored thereupon which, when executed by a one or more processors of a computing device, cause the one or more processors of the computing device to: receive input data associated with an authentication request of an identity; receive positioning data indicating a location of the identity; determine that the location is within a predetermined area; determine that a pattern of movement associated with the identity is consistent with a predetermined pattern of movement; and authenticate the identity based at least in part on the location, and the pattern of movement.

Clause P. The computer-readable storage medium of Clause O, wherein the instructions cause the processor to generate permission data that authorizes access to one or more of secured data or performance of an action.

Clause Q. The computer-readable storage medium of Clauses O-P, wherein the instructions cause the processor to generate second permission data that revokes access to the one or more of secured data or the performance of the action based at least in part on a determination that one or more verification procedures fails to meet one or more criteria while the location associated with the identity is within the predetermined area.

Clause R. The computer-readable storage medium of Clauses O-Q, wherein the instructions cause the processor to generate second permission data that revokes access to the one or more of secured data or the performance of the action based at least in part on a determination that the location associated with the identity is outside of the predetermined area.

Clause S. The computer-readable storage medium of Clauses O-R, wherein determining that the pattern of movement associated with the identity is consistent with the predetermined pattern of movement comprises identifying an action performed by the user.

Clause T. The computer-readable storage medium of Clauses O-S, further comprising determining that one or more other users are at the predetermined area and wherein authenticate the identity is further based, at least in part on determining that the one or more other users are at the predetermined area.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method, comprising:
   receiving input data indicating a request to access secured data associated with a user;
   receiving positioning data indicating a current location of a first computing device that is associated with the user;
   determining that the positioning data indicates that the current location of the first computing device is within a predetermined area;
   determining that one or more additional verification procedures indicates that the user is physically present within the predetermined area while the positioning data indicates that the current location of the first computing device is within the predetermined area, wherein a verification input from the user causes an execution of the one or more additional verification procedures at a second computing device that is physically located within the predetermined area;

in response to determining that the current location of the first computing device is within a predetermined area and confirming execution of the one or more additional verification procedures by the second computing device located within the predetermined area, generating permission data allowing access to the secured data; and generating second permission data that revokes access to the secured data based at least in part on determining one or more of that a pattern of movement is inconsistent with a predetermined pattern of movement or that the current location of the computing device has moved outside of the predetermined area.

2. The computer-implemented method of claim 1, wherein receiving the positioning data comprises receiving the positioning data from the computing device associated with the user.

3. The computer-implemented method of claim 1, further comprising generating second permission data that revokes access to the secured data when the current location of the computing device moves outside of the predetermined area; when the one or more criteria of the one or more verification procedures are no longer met; or when a pattern of movement associated with the computing device is inconsistent with a predetermined pattern of movement.

4. The computer-implemented method of claim 1, wherein determining that the requested operation is performed comprises identifying a gesture performed by the user with respect to the computing resource that is different than the computing device and determining that the gesture is consistent with the requested operation.

5. The computer-implemented method of claim 1, further comprising determining that the current location of the computing device that is associated with the user is consistent with data indicating a planned location of the user, wherein the data indicating the planned location is based, at least in part, on an invitation to attend a meeting, wherein the invitation defines a meeting time and a name of a conference room, and wherein generating the map data comprises assigning the conference room the name.

6. The computer-implemented method of claim 1, wherein the one or more additional verification procedures performed on the second computing device comprises determining that the verification input indicates biometric data associated with the user, and the permission data allowing access to the secured data further requires determining that the verification input indicates the biometric data associated with the user.

7. The computer-implemented method of claim 1, wherein the one or more additional verification procedures performed on the second computing device comprises:
displaying instructions to move in predetermined pattern of movement;
receiving additional positioning data indicating a current pattern of movement of the user; and
confirming execution of the one or more additional verification procedures in response to determining that the predetermined pattern of movement is consistent with a predetermined pattern of movement.

8. A system, comprising:
a processor; and a memory in communication with the processor, the memory having computer-readable instructions stored thereupon that, when executed by the processor, cause the processor to receive a first input indicating an authentication request of a user;

receive positioning data indicating a current location of a computing device that is associated with the user;

determine that the positioning data indicates that the current location of the computing device is within a predetermined area;

determine that an additional verification procedure indicates that the user is physically present within the predetermined area while the positioning data indicates that the current location of the computing device is within the predetermined area, wherein the additional verification procedure comprises receiving a second input indicating that the user is physically located or has been located within the predetermined area;

authenticate the user for providing access to secured data in response to determining that the current location of the computing device is within the predetermined area and confirming execution of the additional verification procedure; and generate permission data that revokes access to the secured data in response to determining that a pattern of movement is inconsistent with a predetermined pattern of movement or in response to determining that the computing device has moved outside of the predetermined area.

9. The system of claim 8, wherein the instructions cause the processor to generate a first permission data that authorizes performance of computer implemented action in response to determining that the current location of the computing device is outside the predetermined area and confirming execution of the additional verification procedure.

10. The system of claim 9, wherein the instructions cause the processor to generate the permission data that revokes access to the secured data or denies the performance of the computer implemented action based at least in part on a determination that the additional verification procedures fails to meet one or more criteria.

11. The system of claim 8, wherein the instructions cause the processor to determine that the pattern of movement associated with the user is consistent with the predetermined pattern of movement based on physical actions of the user captured by an imaging device.

12. The system of claim 11, wherein the action corresponds to-one or more of a gesture performed by the user or a predetermined pattern of movement performed by the user within the predetermined area.

13. The system of claim 12, wherein the instructions cause the processor to access metadata to determine the predetermined pattern of movement.

14. The system of claim 8, wherein the instructions cause the processor to determine that the current location of the computing device that is associated with the user is consistent with data indicating a planned location of the user.

15. The computer-implemented method of claim 8, wherein the second input comprises image data of an object that is located within the predetermined area, wherein the user is authenticated in response to determining that the image data comprises an image of the object.

16. The computer-implemented method of claim 8, further comprising:

receiving contextual data from a server storing calendar data;

determining that the contextual data indicates that the user has been scheduled to be within the predetermined location, wherein the user is authenticated in response to determining that the contextual data indicates that the user has been scheduled to be within the predetermined location.

17. A non-transitory computer-readable storage medium having computer-executable instructions stored thereupon which, when executed by a one or more processors of a computing device, cause the one or more processors of the computing device to:

receive input data associated with an authentication request of a user;

receive positioning data indicating a current location of a computing device that is associated with the user;

determine, based on the positioning data, that the current location of the computing device is within a predetermined area;

determine that an operation has been performed with respect to a computing resource that is different than the computing device and that is physically present within the predetermined area, wherein performance of the operation is indicative that the user is within the predetermined area;

authenticate the user in response to determining that the current location of the computing device is within a predetermined area by the positioning data and confirming performance of the operation indicating that the user is located within the predetermined area; and generating permission data that revokes the user access to secured data based at least in part on determining one or more of that a pattern of movement is inconsistent with a predetermined pattern of movement or that the current location of the computing device has moved outside of the predetermined area.

18. The non-transitory computer-readable storage medium of claim 17, wherein authentication of the user grants permission for the user to access secured data or perform an action.

19. The non-transitory computer-readable storage medium of claim 18, wherein the instructions cause the processor to generate second permission data that denies authorization of the user to access the secured data or perform the action based at least in part on a determination that one or more verification procedures fails to meet one or more criteria while the current location associated with the user is within the predetermined area.

20. The non-transitory computer-readable storage medium of claim 18, wherein the instructions cause the processor to generate second permission data that revokes authorization of the user to access the secured data or perform the action based at least in part on a determination that the current location associated with the user is outside of the predetermined area.

21. The non-transitory computer-readable storage medium of claim 17, wherein the instructions cause the processor to determine that a pattern of movement associated with the user is consistent with a predetermined pattern of movement.

22. The non-transitory computer-readable storage medium of claim 21, further comprising determining that one or more other users are at the predetermined area and wherein authenticating the user is further based, at least in part on determining that the one or more other users are at the predetermined area.

* * * * *